(12) United States Patent
Alawad

(10) Patent No.: US 12,556,233 B1
(45) Date of Patent: Feb. 17, 2026

(54) SYSTEM FOR REDUCING DUPLICATE SIGNALING IN A WIRELESS NETWORK

(71) Applicant: IMAM MOHAMMAD IBN SAUD ISLAMIC UNIVERSITY, Riyadh (SA)

(72) Inventor: Mohamad A. Alawad, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/321,058

(22) Filed: Sep. 5, 2025

(51) Int. Cl.
   *H04B 7/04* (2017.01)
   *H04B 7/0413* (2017.01)
   *H04B 7/185* (2006.01)
   *H04L 5/00* (2006.01)

(52) U.S. Cl.
   CPC ....... *H04B 7/04013* (2023.05); *H04B 7/0413* (2013.01); *H04B 7/18513* (2013.01); *H04L 5/0048* (2013.01)

(58) Field of Classification Search
   CPC ............. H04B 7/04013; H04B 7/0413; H04B 7/18513; H04L 5/0048
   USPC .......................................... 370/329; 455/312
   See application file for complete search history.

(56) References Cited

U.S. PATENT DOCUMENTS

| | | | |
|---|---|---|---|
| 2025/0015877 | A1 | 1/2025 | Nam et al. |
| 2025/0192828 | A1* | 6/2025 | Kim .................... H04B 7/06952 |

FOREIGN PATENT DOCUMENTS

| | | |
|---|---|---|
| CN | 117177331 A | 12/2023 |
| WO | 2024015324 A1 | 1/2024 |
| WO | 2024/250259 A1 | 12/2024 |

* cited by examiner

*Primary Examiner* — Marcos Batista
(74) *Attorney, Agent, or Firm* — Oblon, McClelland, Maier & Neustadt, L.L.P.

(57) ABSTRACT

A system reduces duplicate signaling in a wireless network using a reconfigurable intelligent surface (RIS) mounted on a structure and positioned in a signal path between a transmitter and a receiver. The RIS includes passive reflecting elements electrically connected to control circuitry. The control circuitry receives a RIS configuration allowance parameter from a Master Information Block message and uses this parameter to adjust both phase shifts of the passive reflecting elements and multi-input multi-output (MIMO) beamforming. The unified control through a single parameter coordinates RIS and MIMO operations while reducing signaling overhead.

18 Claims, 10 Drawing Sheets

SYSTEM FOR REDUCING DUPLICATE SIGNALING IN A WIRELESS NETWORK

BACKGROUND

Technical Field

The present disclosure is directed at telecommunication networks, and more particularly to a system for reducing duplicate signaling in a wireless network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Currently, the development of sixth-generation (6G) and beyond-6G (B6G) networks (also referred to as wireless networks or telecommunication networks) is driving the integration of advanced technologies aimed at significantly improving spectrum efficiency, energy efficiency, and user experience. The emerging advanced technologies for next-generation networks (i.e., the 6G network and beyond 6G networks) may include non-terrestrial networks (NTNs), multiple-input multiple-output (MIMO), and reconfigurable intelligent surfaces (RIS). These emerging advanced technologies are particularly critical for enabling global connectivity, especially in remote and underserved areas where terrestrial infrastructure is limited or non-existent. MIMO and RIS technologies are both used to manipulate electromagnetic wave propagation to enhance communication performance. MIMO technology achieves the manipulation of electromagnetic wave propagation through the use of multiple antennas at both a transmitter and a receiver to support spatial multiplexing, diversity, and beamforming. On the other hand, RIS technology employs intelligent surfaces composed of many passive or semi-passive elements to reconfigure the propagation environment by reflecting and directing electromagnetic waves toward an intended user equipment (UE).

Further, an integration of MIMO and RIS technology with NTN systems can jointly enhance spectrum efficiency, coverage, and quality of experience (QoE) for end users (customers). Furthermore, multi-user extensions of MIMO and RIS technologies, namely, multi-user MIMO (MU-MIMO) and multi-user RIS (MU-RIS), enable simultaneous communication with multiple end users. The multi-user extension of MIMO and RIS technologies shares similar hardware and software characteristics, particularly in terms of beam control mechanisms used to direct the electromagnetic waves toward different UEs.

However, despite the potential of the multi-user extension of MIMO and RIS technologies, an adoption of the MU-MIMO and the MU-RIS in UEs working beyond-fifth-generation (5G) may introduce significant challenges. Both technologies, i.e., the MU-MIMO and the MU-RIS are heavily reliant on overhead signaling and require complex control procedures to manage network parameters and beam configurations. When implemented separately, the MU-MIMO and the MU-RIS result in duplicated signaling, redundant message flows, and excessive resource consumption, negatively impacting the overall performance, efficiency, and scalability of the communication network and the UEs.

Accordingly, it is one object of the present disclosure to provide a system to reduce duplicate signaling in a wireless network.

SUMMARY

In an exemplary embodiment, a system to reduce duplicate signaling in a wireless network is disclosed. The system includes a reconfigurable intelligent surface (RIS) mounted on a structure, positioned in a signal path between a transmitter and a receiver, having a plurality of passive reflecting elements. The system further includes a control circuitry electrically connected to the plurality of passive reflecting elements. The control circuitry is configured to receive a RIS configuration allowance parameter from a Master Information Block (MIB) message. The control circuitry is further configured to adjust phase shifts of the plurality of passive reflecting elements based on the received RIS configuration allowance parameter. The control circuitry is further configured to adjust multi-input multi-output (MIMO) beamforming based on the received RIS configuration allowance parameter. The received RIS configuration allowance parameter adjusts both the MIMO beamforming and the phase shifts of the plurality of passive reflecting elements.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
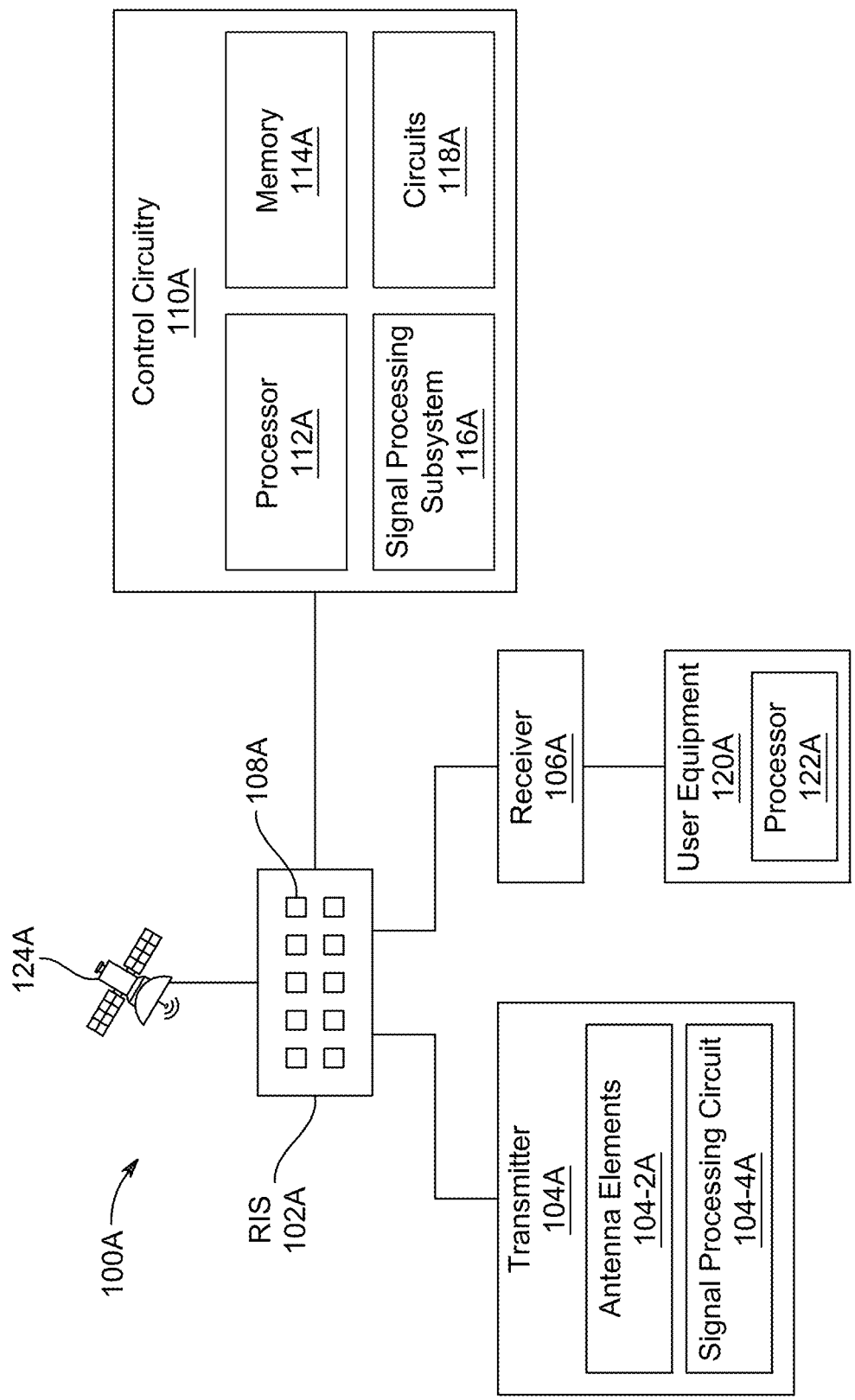
FIG. 1A is an exemplary block diagram of a system configured to reduce duplicate signaling in a wireless network, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Recent studies within the $3^{rd}$ generation partnership project (3GPP) specifications are focused on enhancing non-terrestrial network (NTN) capabilities, particularly downlink coverage and uplink capacity, to support geostationary orbit (GSO) and non-geostationary orbit (NGSO) satellite constellations operating in frequency ranges denoted as FR1-NTN and FR2-NTN. Additionally, there are efforts to improve uplink capacity and cell throughput for the FR1-NTN under random access memory (RAN) configurations, i.e., RAN1, RAN2, and RAN4.

As part of the release of 17 new radio (NR) NTN solutions, two NTN-specific frequency bands were defined, i.e., a band n255 and a band n256, corresponding to portions of international telecommunication union-radiocommunication sector (ITU-R) L-band and S-band. These definitions include signaling procedures for broadcast service areas. Additionally, there are proposals under discussion to define a new NR NTN band to support the extended L-band of the mobile satellite service (MSS), with a downlink range of 1518-1525 megahertz (MHz) and uplink range of 1668-1675 MHz. This aligns with the existing band 253 used for inter-of-things (IoT)-NTN. A broader initiative aims to combine both standard and extended L-band allocations, spanning 1525-1559 MHz (downlink) and 1626.5-1675 MHz (uplink).

Current 3GPP procedures for beam management for MIMO networks include periodic, semi-persistent, or aperiodic beam reporting. While effective for optimizing beam selection, the current 3GPP procedure results in high uplink control overhead. Conversely, reduced reporting frequency can lead to outdated beam information, degrading system performance. Further, enhancements in MIMO, referred to as feMIMO, are also under evaluation. The feMIMO includes updated signal and radio resource management (RRM) conformance test specifications, taking into account various test cases and environments for NR_feMIMO.

Looking ahead to 3GPP Release 20, reconfigurable intelligent surfaces (RIS) are gaining attention for 6G networks. Companies like Zhongxing Telecommunication Equipment (ZTE) and KDDI propose RIS for improving coverage, aiding User Equipment (UE) identification, and mitigating signal blockages, particularly in FR2. RIS channel modeling, control signaling, and radio frequency architecture are emerging as key areas of standardization for fifth-generation (5G)-advanced and 6G networks.

Although RIS in NTNs has not yet entered formal standardization, academic research is actively exploring this integration of the RIS in NTNs. Emerging architectures include beyond-diagonal RIS (BD-RIS), which features interconnected phase response elements (PREs) for enhanced environmental control, and holographic MIMO surfaces (HMIMOS), which use sub-wavelength scatterers to form cost-effective, energy-efficient antenna systems. HMIMOS could drastically reduce satellite manufacturing and launch costs, democratizing access to satellite communications.

Future NTN developments are also aligned with ubiquitous and resilient connectivity goals for 6G networks. NTNs may lower overall energy consumption and support seamless integration with terrestrial networks (TN). The seamless integration of TN includes interoperability at both the 6G network and service management levels, with minimal perceived latency to ensure high quality of experience (QoE).

In the present disclosure, the redundancy associated with managing overlapping network parameters, signaling procedures, and control messages between multi-user MIMO (MU-MIMO) and multi-user RIS (MU-RIS) technologies is mitigated. By unifying control of information flow within the NTN architecture, the present disclosure effectively reduces signaling overhead and procedural complexity. As a result, an overall spectrum utilization and energy efficiency of both TNs and/or NTNs can be significantly enhanced, thereby supporting scalable and sustainable deployment of massive MIMO/RIS-assisted 6G networks.

Aspects of this disclosure are directed to a system for reducing duplicate signaling in a wireless network. The wireless network may be a sixth generation (6G) network or beyond 6G network. In order to reduce duplicate signaling in the wireless network, the system includes a reconfigurable intelligent surface (RIS) mounted on a structure, positioned in a signal path between a transmitter and a receiver, having a plurality of passive reflecting elements. The system further includes a control circuitry electrically connected to the plurality of passive reflecting elements. The control circuitry is configured to receive a RIS configuration allowance parameter from a Master Information Block (MIB) message. The control circuitry is further configured to adjust phase shifts of the plurality of passive reflecting elements based on the received RIS configuration allowance parameter. The control circuitry is further configured to adjust multi-input multi-output (MIMO) beamforming based on the received RIS configuration allowance parameter. In particular, the received RIS configuration allowance parameter adjusts both the MIMO beamforming and the phase shifts of the plurality of passive reflecting elements.

Referring now to FIG. 1A, the present disclosure represents an exemplary block diagram of a system 100A configured to reduce duplicate signaling in a wireless network, according to certain embodiments. Examples of the wireless network may include, but are not limited to, a 5G advance network, a 6G network, and beyond 6G networks. In an embodiment, duplicate signaling refers to the redundant transmission of identical or overlapping control messages or network parameters (e.g., beamforming configuration, reference signal received power (RSRP), etc.) across different network components (e.g., gNodeB (gNB), a user equipment (UE), a gateway, etc.) or technologies (e.g., beamforming, handover management, etc.). The redundant transmission can lead to increased signaling overhead, inefficiencies, and unnecessary resource consumption in the wireless network.

In order to reduce the duplicate signaling in the wireless network, the system 100A includes a reconfigurable intelligent surface (RIS) 102A. The RIS 102A may be mounted on a structure that is positioned in a signal path between a transmitter 104A and a receiver 106A. In an embodiment, the structure is a terrestrial structure within a terrestrial network (TN). Examples of terrestrial structures include communication towers, building facades, rooftops, or ground-based platforms. For non-terrestrial implementations, the structure may comprise satellite platforms, high-altitude platform systems, or other airborne vehicles within the NTN. The RIS mounted on the structure is electromagnetically coupled to a non-terrestrial network (NTN) component with a non-terrestrial MIMO antenna. The NTN component operates according to a 3rd Generation Partnership Project (3GPP) specification for the NTN. The TN is a ground-based communication infrastructure that includes base stations, towers, and backhaul systems to provide wireless connectivity to end users (i.e., a user associated with the UE 120A). For example, the TN may be a cellular network like 5G or 6G infrastructure deployed in urban or rural areas. Further, the NTN consists of spaceborne or airborne communication platforms, such as satellites or high-altitude platforms, designed to provide coverage where TNs are limited or unavailable. For example, the NTN may be a low earth orbit (LEO) satellite used to extend 5G or 6G network connectivity in remote regions. Further, the NTN component is a subsystem of an NTN, such as a satellite payload or an onboard antenna array, that performs communication functions per NTN standards. In an embodiment, the 3GPP specifications refer to technical standards developed by the 3GPP to ensure global interoperability and performance of mobile communication systems, including 5G and upcoming 6G technologies.

In an embodiment, the system 100A further includes an NTN-MIMO transmitter. The NTN-MIMO transmitter may be located on a satellite 124A within the NTN. The NTN-MIMO transmitter may be electromagnetically coupled to the RIS 102A. The NTN-MIMO transmitter further includes a parameter generation processor. The parameter generation processor is configured to generate the RIS configuration allowance parameter. Further, an encoding processor is communicatively coupled to the parameter generation processor. The encoding processor is configured to encode the RIS configuration allowance parameter into a Master Information Block (MIB) message. Furthermore, the encoding processor is configured to encode the RIS configuration element into the SIB19 as defined in the 3GPP specifications for the NTN to adjust both the NTN-MIMO beam forming and the phase shifts of a plurality of passive reflecting elements. Additionally, the encoding processor is configured to encode the RIS timing element into the SIB31 as defined in the 3GPP specifications for the NTN to adjust both the NTN-MIMO beam forming and the phase shifts of the plurality of passive reflecting elements. In an embodiment, beamforming refers to a signal processing technique used in MIMO systems to direct radio signals toward specific UEs by adjusting the amplitude and phase of signals across multiple antennas to enhance signal strength, coverage, and interference suppression in desired directions. Further, the phase shifts refer to controlled changes in a phase of an electromagnetic wave at each passive reflecting element in the RIS 102A. By precisely adjusting the phase shifts, reflected wavefronts can be constructively combined to focus energy or redirect signals effectively. Further, the NTN-MIMO transmitter includes a radio frequency (RF) transmission circuit communicatively coupled to the encoding processor. The RF transmission circuit is configured to transmit the encoded MIB message, the SIB19, and the SIB31 to the receiver 106A.

Further, the RIS 102A may include the plurality of passive reflecting elements, e.g., a passive reflective element 108A. The RIS 102A comprises a two-dimensional array of unit cells, where each unit cell contains one or more passive reflecting elements. Each unit cell may include metallic patches, dipoles, or other conductive elements with controllable components such as PIN diodes or varactor diodes to enable phase adjustment. The RIS 102A may be implemented as a printed circuit board or flexible substrate with the passive reflecting elements arranged in a periodic array pattern. Each of the plurality of passive reflecting elements is configured with individually adjustable phase shifts. In an embodiment, the transmitter 104A is a network component (e.g., a gateway, i.e., TN-gNB, non-terrestrial network (NTN)-gNB, or a satellite 124A) that emits wireless signals carrying data toward a UE (e.g., a UE 120A) or intermediary surfaces. Further, the receiver 106A is typically a receiver of the UE 120A that captures and decodes incoming wireless signals for data reception and communication. Furthermore, the passive reflective element 108A is a component of the RIS 102A that reflects incident radio waves without active signal processing or amplification.

Examples of passive reflecting elements include metallic patches with dimensions related to the operating wavelength, dipole elements, or other resonant structures. Each passive reflecting element may incorporate controllable components such as PIN diodes that switch between conducting and non-conducting states to create phase shifts, or varactor diodes that provide variable phase control through bias voltage adjustment.

Further, the system 100A may include a control circuitry 110A. The control circuitry 110A is electrically connected to the plurality of passive reflecting elements. Further, the control circuitry 110A is configured to receive the RIS configuration allowance parameter from the MIB message. In an embodiment, the RIS configuration allowance parameter is a control signal that specifies whether the RIS 102A is permitted to adjust the plurality of passive reflective elements during operation of the wireless network. For example, the RIS configuration allowance parameter enables or restricts the RIS 102A from updating beam directions based on the needs of the wireless network. Further, the MIS message is a broadcast message transmitted by a base station (e.g., the TN-gNB, the NTN-gNB, etc.) that provides essential information needed by the UE 120A or the RIS 102A for initial access. For example, the essential information may be a system frame number (SFN), a subcarrier spacing configuration, and the like. By way of example, the MIB message may carry synchronization signals and configuration flags like the RIS configuration allowance parameter. In an embodiment, the RIS configuration allowance parameter in the MIB message includes a "RIS-TypeA-Position" parameter with an enumerated value of {allowed, notAllowed} that indicates whether the phase shifts of the plurality of reflecting elements are permitted in coordination with a "dmrs-TypeA-Position" parameter.

Further, the control circuitry 110A is configured to adjust phase shifts of the plurality of passive reflecting elements based on the received RIS configuration allowance parameter. In an embodiment, the phase shift refers to a change in the phase angle of an electromagnetic wave as the electromagnetic wave reflects off a surface or passes through a medium. Additionally, the control circuitry 110A is configured to adjust multi-input multi-output (MIMO) beamforming based on the received RIS configuration allowance parameter. The MIMO beamforming is performed by the transmitter 104A through digital signal processing that controls the amplitude and phase of signals transmitted from the plurality of antenna elements 104-2A. The RIS 102A operates independently by adjusting the phase shifts of reflected electromagnetic waves through the passive reflecting elements. The control circuitry 110A coordinates both the transmitter beamforming and RIS phase adjustments using the same RIS configuration allowance parameter to achieve unified operation. In an embodiment, the MIMO beamforming is a signal processing technique used in multi-antenna systems to direct signals toward a specific UE (e.g., a UE 120A) by adjusting the phase and amplitude of transmitted signals. The received RIS configuration allowance parameter adjusts both the phase shift and the MIMO beamforming.

In an embodiment, the transmitter 104A further comprises a plurality of antenna elements 104-2A and a signal processing circuit 104-4A. In an embodiment, the plurality of antenna elements 104-2A are used to emit electromagnetic signals, enabling wireless communication with the UE 120A or the RIS 102A by forming directional beams in a MIMO configuration. Further, the signal processing circuit 104-4A is configured to generate a demodulation reference signal (DMRS) according to a DMRS configuration. The DMRS is a reference signal used in wireless communication to help the receiver 106A accurately estimate a channel for demodulating data within the transmitted electromagnetic signal.

In an embodiment, the control circuitry 110A further includes circuits 118A. The circuits 118A may include a signal analysis circuit, a resource identification circuit, a phase adjustment circuit, a signal quality measurement circuit, a blockage detection circuit, a coordination circuit, a multiplexing circuit, a spectrum management circuit, a resource management circuit, a timing circuit, an adaptive adjustment circuit, a coverage enhancement circuit, and a capacity enhancement circuit.

The signal analysis circuit is configured to detect signal degradation in an NTN-MIMO beam forming operation. The resource identification circuit is configured to identify the plurality of passive reflecting elements for signal compensation. The phase adjustment circuit is configured to adjust the plurality of passive reflecting elements to compensate for amplitude or phase degradation. The signal quality measurement circuit is configured to monitor specific received signal strength indicator (RSSI) and reference signal received quality (RSRQ) parameters while reducing energy transmission requirements. The RSSI is a measure of a power level that a receiving device (e.g., the UE 120A) detects from a radio signal. The RSSI is typically measured in decibel-milliwatts (dBm). A higher RSSI value (closer to 0) indicates a stronger signal. Further, the RSRQ is a measure of signal quality, factoring in interference and noise. The RSRQ combines both the strength and the quality of the received signal. The RSRQ is expressed in decibel (dB), with higher (less negative) values indicating better quality.

In an embodiment, the blockage detection circuit is configured to identify blockages affecting the NTN-MIMO beam forming operation. The coordination circuit is configured to coordinate signals between the NTN-MIMO transmitter and the plurality of passive reflecting elements of the RIS 102A. The multiplexing circuit is configured to process signals for uplink capacity improvement. The spectrum management circuit is configured to improve spectrum utilization within geographical regulatory constraints.

The resource management circuit is configured to identify and coordinate a resource of the plurality of passive reflecting elements and a MIMO resource across the TN and the NTN. In an embodiment, the coordination of the resource of the plurality of passive reflecting elements and the MIMO resource occurs based on the RIS configuration allowance parameter in the MIB message and implemented using the RIS configuration element in the SIB19 and the RIS timing element in the SIB31 to reduce duplicate signaling procedures across the wireless network. The timing circuit is configured to extract and process a timing parameter, including RIS network timing advance parameters, from the NTN-MIMO transmitter. In particular, the control circuitry 110A synchronizes the phase shifts of the plurality of passive reflecting elements based on the timing parameter.

The adaptive adjustment circuit is configured to adjust the individual phase shifts to compensate for signal degradation due to an atmospheric, a geographical, or an electromagnetic condition. Examples of the atmospheric condition may include a heavy rainfall, an ionospheric scintillation, a cloud cover or fog, and the like. Examples of the geographical condition may include mountainous terrain, urban canyons, forests or dense vegetation, etc. Examples of the electromagnetic condition may include man-made interference, solar flares, industrial machinery, etc. In an embodiment, the adjustments in the individual phase shifts are updated based on the RSSI and RSRQ parameters. The coverage enhancement circuit is configured to improve downlink coverage by compensating for an NTN signal contamination using the phase shifts of the plurality of reflecting elements in operation. The capacity enhancement circuit is configured to increase uplink capacity through multiplexing techniques using coordinated beam forming between the NTN-MIMO transmitter and the RIS 102A. Examples of the multiplexing techniques may include spatial division multiple access (SDMA), frequency division multiple access (FDMA), time division multiple access (TDMA).

In an embodiment, the control circuitry 110A further includes a processor 112A and a memory 114A. The processor 112A and the memory 114A may be electrically connected to the plurality of passive reflecting elements. The processor 112A, for example, may be a digital signal processor (DSP) or a field-programmable gate array (FPGA), etc. Further, the memory 114A for example, may be a non-volatile flash memory, a dynamic RAM (DRAM), etc. In an embodiment, the RIS configuration allowance parameter within the MIB message indicates whether RIS operation is permitted in coordination with the DMRS configuration. The DMRS configuration, for example, may include a DMRS type configuration, a DMRS position configuration, a DMRS port configuration, and the like.

In an embodiment, the control circuitry 110A further includes a signal processing subsystem 116A. The signal processing subsystem 116A is configured to extract and process system information block 19 (SIB19) and system information block 31 (SIB31) from the NTN. In an embodiment, the SIB19 and the SIB31 contain the RIS configuration element and the RIS timing element that the control circuitry 110A uses to coordinate both the MIMO beamforming and the RIS phase shift adjusting. The RIS configuration element provides parameters that define how the RIS 102A should operate, such as beam direction, reflection coefficients, or activation status. For example, the RIS configuration element may specify which RIS elements to activate and associated reflection settings to optimize coverage in an NTN link. Further, the RIS timing element includes timing-related parameters that synchronize adjustments of the RIS 102A with MIMO transmissions or satellite beam cycles. For example, the RIS timing element may define time offsets or alignment windows to ensure that the phase shifts occur in synchronization with MIMO beamforming slots.

In particular, the signal processing subsystem 116A is configured to extract and process neighbor cell configuration information through the SIB19. The SIB19 is defined in the 3GPP specifications for the NTN, and includes the RIS configuration element providing information about a non-terrestrial RIS neighbor cell configuration and a terrestrial RIS neighbor cell configuration. Further, the control circuitry 110A uses the neighbor cell configuration information to coordinate the phase shifts of the plurality of reflecting elements across a plurality of network cells. In particular, the SIB19 defined in the 3GPP specifications for the NTN, includes the RIS configuration element providing at least one of a NTN RIS configuration, a non-terrestrial RIS neighbor cell configuration, and a terrestrial RIS neighbor cell configuration. Further, the SIB31 defined in the 3GPP specifications for the NTN includes the RIS timing element providing at least one of a RIS network-controlled common timing advance parameter, a RIS common timing advance drift parameter, a RIS common timing advance drift variation parameter, a RIS scheduling offset parameter, and a RIS synchronization validity duration parameter. In an embodiment, the RIS network-controlled common timing advance parameter specifies a baseline timing offset to align uplink transmissions of the UE 120A with RIS 102A assisted signal relaying. The RIS common timing advance drift parameter indicates a gradual variation in the baseline timing offset due to satellite motion or RIS dynamics that may affect uplink signal alignment over time. The RIS common timing advance drift variation parameter defines the allowable range or fluctuation around a drift rate of the timing advance to maintain reliable synchronization between the UE 120A and the RIS 102A. The RIS synchronization validity duration parameter defines the maximum time duration for which the RIS-based timing and synchronization parameters remain valid before a new synchronization procedure is required.

In an embodiment, the UE 120A may include the receiver 106A. The receiver 106A may be electromagnetically coupled to the RIS 102A. The UE 120A further includes a processor 122A operatively connected to the receiver 106A. The processor 122A may be configured to decode the MIB message transmitted by the NTN-MIMO transmitter and contain the RIS configuration allowance parameter for adjusting both the NTN-MIMO beam forming and the phase shifts of the plurality of passive reflecting elements. Further, the processor 122A is configured to interpret the SIB19 containing the RIS configuration element and the SIB31 containing the RIS timing elements for adjusting the NTN-MIMO beam forming and the phase shifts of the plurality of passive reflecting elements. Furthermore, the processor 122A is configured to coordinate signal reception adjustments based on the RIS configuration allowance parameter. In an embodiment, the processor 122A of the UE 120A is further configured to maintain connection during blockage events by switching between a primary connection using an NTN-MIMO technology and a secondary assistance from the RIS 102A, or a primary connection through the RIS 102A and a secondary assistance using the NTN-MIMO technology. The NTN-MIMO technology refers to a communication system where satellites use multiple antennas to simultaneously transmit and receive multiple signal streams, enhancing data rates and reliability. This technology enables spatial multiplexing and beamforming to overcome the challenges of long-distance satellite links and varying channel conditions. In an embodiment, the control circuitry 110A is configured to implement different operational modes based on a signal condition. Further, the processor 122A of the UE 120A is configured to switch between different connection configurations in coordination with the control circuitry 110A. The operational modes and the connection configurations include a TN MIMO with a TN RIS assistance mode, an NTN MIMO with a TN RIS assistance mode, and an NTN MIMO with an NTN RIS assistance mode.

Figure 1B:
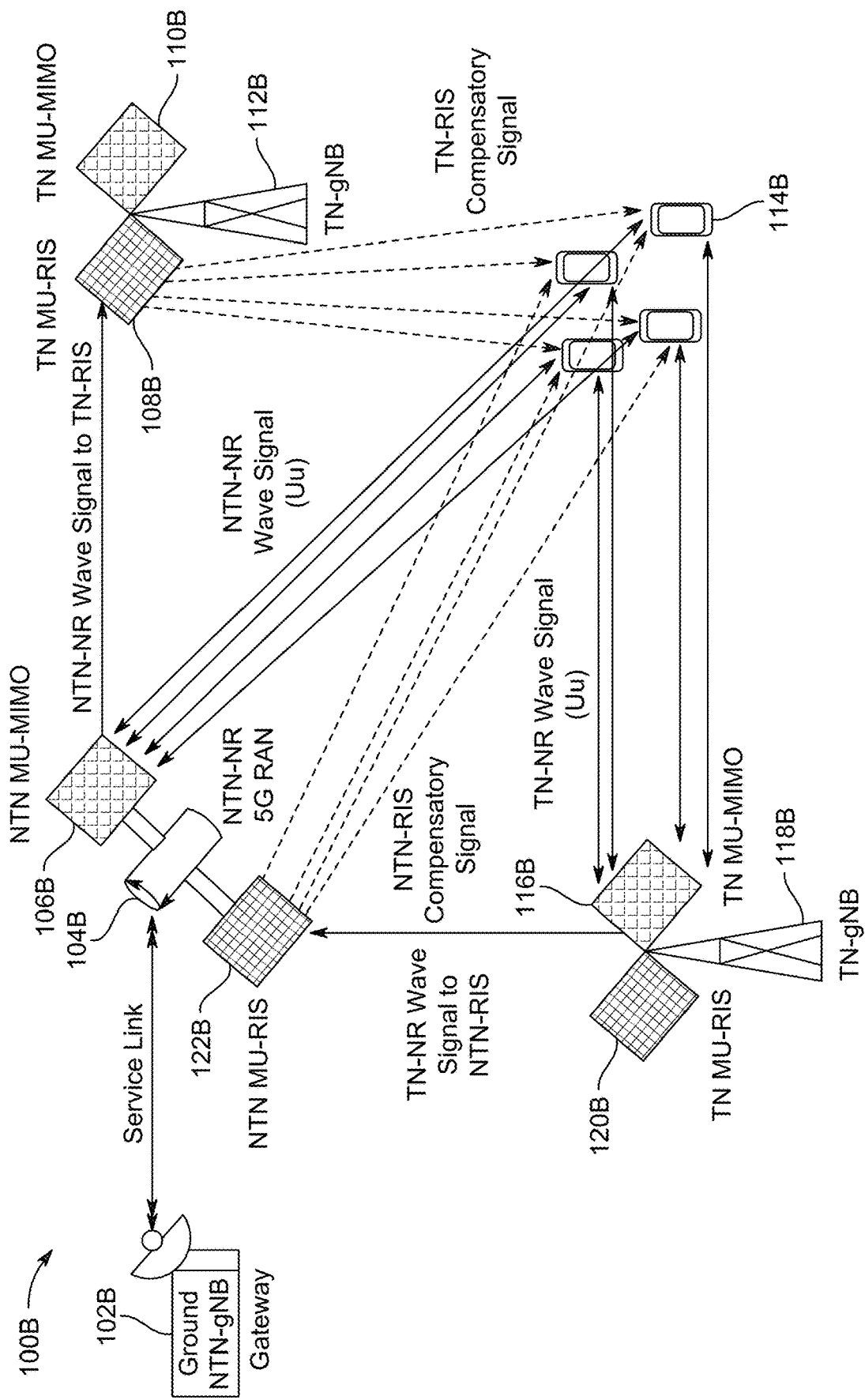
FIG. 1B is an exemplary diagram depicting a unified sixth-generation (6G) network architecture integrating non-terrestrial networks (NTNs) and/or terrestrial networks (TNs) with multi-input multi-output (MIMO) and/or reconfigurable intelligent surface (RIS) technologies, according to certain embodiments.

Referring now to FIG. 1B, the present disclosure provides an exemplary diagram 100B depicting a unified sixth-generation (6G) network architecture integrating NTNs and/or TNs with MIMO and/or RIS technologies, according to certain embodiments. In other words, the exemplary architecture 100B relates to a next-generation wireless communication system architecture (i.e., a unified 6G network architecture) including integrated NTN and TN elements, enhanced through coordinated use of multi-user-MIMO (MU-MIMO) and multi-user-RIS (MU-RIS). Initially, an NTN-gNB gateway 102B (e.g., the transmitter 104A) may establish a service link with NTN-new radio (NR) 5G Radio Access Network (RAN) 104B (e.g., the satellite 124A). In an embodiment, the service link may carry both control/signaling information and optionally, user data between the NTN-gNB gateway 102B and the NTN-NR 5G RAN 104B. The control/signaling information may include synchronization data, system information (e.g., the MIB message, system information blocks (SIBs) message), resource configuration, and satellite ephemeris needed for UE access and timing alignment. The NTN-NR 5G RAN 104B is a satellite-based extension of a 5G RAN that enables wireless communication between satellites and the UE.

The NTN-NR 5G RAN 104B is equipped with an NTN MU-MIMO 106B and an NTN MU-RIS 122B. In one embodiment, the NTN MU-MIMO 106B is configured to broadcast an NTN NR wave signal (Uu) directly to one or more UEs 114B. In addition, the NTN MU-MIMO 106B broadcast the NTN NR wave signal (Uu) to a TN MU-RIS 108B of a TN-gNB 112B. Further, the TN-MU-RIS 108B reflects a TN-RIS compensatory signal to the one or more UEs 114B, mitigating signal loss and enhancing link reliability.

In another embodiment, the NTN MU-RIS 122B is configured to directly broadcast an NTN-RIS compensatory signal to the one or more UEs 114B, to enhance coverage and signal quality. The NTN-RIS compensatory signal mitigates signal distortion and delay due to long-distance satellite communication. Further, the one or more UEs 114B are configured to receive a TN-NR wave signal (Uu) from a TN MU-MIMO 116B of a TN-gNB 118B associated with the TN. The TN-gNB 118B is also equipped with a TN MU-RIS 120B. Additionally, the TN MU-MIMO 116B transmits a TN-NR wave signal to the NTN MU RIS 122B. The TN MU-MIMO 116B transmits the TN-NR wave signal (Uu) to the NTN MU RIS 122B to enable an RIS (e.g., the RIS 102A) of the NTN MU-RIS 122B to intelligently manipulate and reflect the TN-NR wave signal (Uu) toward the one or more UEs 114B. In an embodiment, the TN-NR wave signal (Uu) includes synchronization signal blocks (SSBs), the MIB message, System Information Blocks (SIBs), Random Access Channel (RACH) configuration, and the like.

Upon receiving signals, i.e., the NTN NR wave signal (Uu), the TN-RIS compensatory signal, the NTN-RIS compensatory signal, and TN-NR wave signal (Uu), the one or more UEs 114B are configured to scan information received via the signals, such as the SSBs across frequency bands to identify available cells. Further, the one or more UEs 114B are configured to measuring RSSI parameters for each SSB to determine overall received signal power. Further, the one or more UEs 114B are configured to decode the MIB message to extract key information, such as a Public Land Mobile Network Identifier (PLMN ID) and a minimum required received power (Rx-Levmin). Additionally, the one or more UEs 114B are configured to decode enhanced ated values {position 2, position 3}, which specifies a location of a DMRS for MU-MIMO antenna port configuration. By embedding RIS configuration information directly within the MIB message, the present invention eliminates the need for an additional SIB to convey RIS-specific capabilities, thereby conserving critical radio resources and minimizing system complexity. An exemplary MIB message is depicted via an algorithm below:

```
MIB: = SEQUENCE {
    systemFrameNumber          BIT STRING (SIZE (6)),
    subCarrierSpacingCommon    ENUMERATED {scs15or60, scs30or120},
    ssb-SubcarrierOffset       INTEGER (0.15),
    dmrs-TypeA-Position        ENUMERATED {pos2, pos3},
    RIS-TypeA-Position         ENUMERATED {allowed, notAllowed},
    pdcch-ConfigSIB1           INTEGER (0.255),
    cellBarred                 ENUMERATED {barred, notBarred},
    intraFreqReselection       ENUMERATED {allowed, notAllowed},
    spare                      BIT STRING (SIZE (1))
}
```

Information Elements (IEs) like dmrs-TypeA-Position and RIS-TypeA-Position, providing further configuration details, e.g., a specific timing position, whether an RIS assistance is allowed or not allowed for a selected cell. Further, the one or more UEs 114B compares the RSRP parameter against the Rx-Levmin to determine if a reference signal received from the selected cell meets the Rx-Levmin. In an embodiment, the Rx-Levmin is defined in the 3GPP specifications and represents the minimum signal strength necessary for a UE to consider a cell (also referred to as a network cell) suitable for camping and initiating further connection steps. When the reference signal received from the selected cell meets the Rx-Levmin, the one or more UEs 114B select that cell and camp on the cell to initiate connection procedures. The camping on the cell means that each of the one or more UEs 114B locks the selected cell to establish and maintain a connection, essentially "registering" with that cell for further communication.

Figure 2:
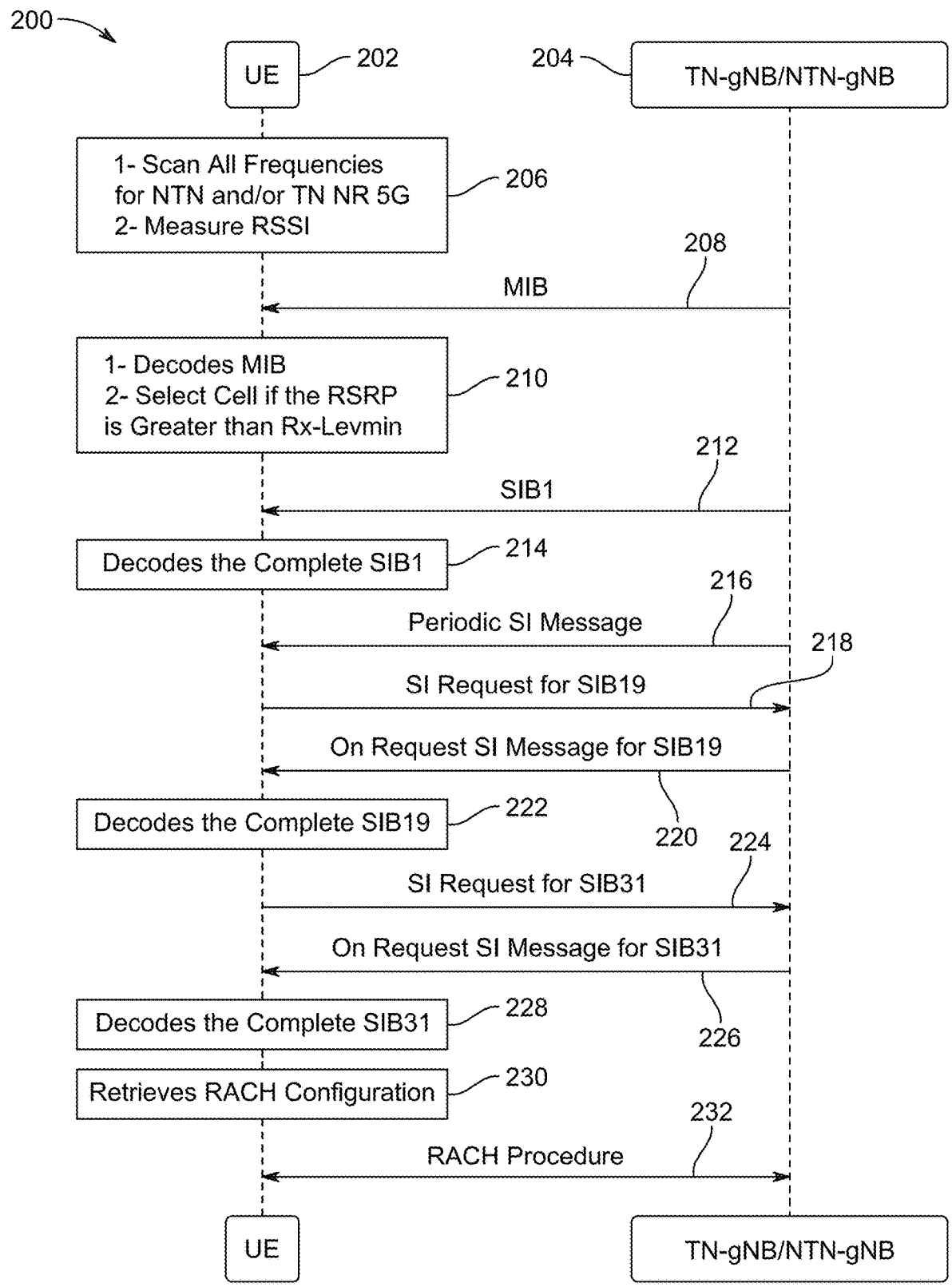
FIG. 2 is an exemplary process flow diagram depicting communication between a user equipment (UE) and a TN-g node B (TN-gNB) and/or an NTN-gNB in the unified 6G network architecture, according to certain embodiments.

Referring now to FIG. 2, the present disclosure provides an exemplary process flow diagram 200 depicting communication between a UE 202 and a TN-g node B (TN-gNB) and/or an NTN-gNB 204 in the unified 6G network architecture, according to certain embodiments. In particular, the process flow diagram 200 discloses a process for optimizing initial access of the UE 202 (e.g., the UE 120A) to either the TN or NTN, or both (depicted as TN-gNB/NTN-gNB 204), by introducing unified IEs for MU-RIS and MU-MIMO configurations within existing SIBs to enhance system efficiency and reduce signaling redundancy. Initially, at step 206, the UE 202 performs a frequency scan across all supported TN and/or NTN NR 5G bands and measures the RSSI parameters from the SSBs. The SSBs contain a physical cell identity (PCI) that are broadcast by the TN-gNB/NTNB-gNB 204 to facilitate cell identification. Further, at step 208, the UE 202 receives and decodes the MIB message which includes essential key parameters such as the PLMN ID, Rx-Levmin (minimum required RSRP for cell selection), and additional configuration parameters.

As a core feature of the present disclosure, the MIB message is extended to include an 'RIS-TypeA-Position' IE, having enumerated values {allowed, notAllowed} which indicates the permissibility of RIS-based transmission configurations for the cell. The inclusion of 'RIS-TypeA-Position' IE is coordinated with the existing 'demodulation reference signal (dmrs)-TypeA-Position', having enumer- Subsequent to decoding of the MIB message, at step 210, the UE 202 compares the PLMN ID with stored values and assesses whether the measured RSRP exceeds the Rx-Levmin. If the measured RSRP exceeds the Rx-Levmin, the UE 202 selects a cell. In response to selecting the cell, at step 212, the UE 202 is configured to receive a SIB1. Further, at step 214, the UE 202 is configured to decode the SIB1. The SIB1 provides further information necessary for network access, including access barring parameters, cell selection information, and RACH configuration scheduling. Further, at step 216, the UE 202 is configured to receive a period SI message from the TN-gNB/NTN-gNB 204. The SI message may be received by the UE 202 at a periodic time interval (e.g., after every 30 minutes). The SI message typically includes the SIB1, and optionally other preconfigured SIBs, such as SIB2-SIB9, depending on the configuration and deployment scenario associated with the wireless network. In addition, at step 218, the UE 202 may be configured to send an SI message request to the TN-gNB/NTN-gNB 204 for SIB19. In response to sending the SI message request, at step 220, the UE 202 is configured to receive the SIB19 as a response from the TN-gNB/NTN-gNB 204. The SIB19 defined in the 3GPP specifications for NTN includes the RIS configuration element providing at least one of the NTN RIS configuration, the non-terrestrial RIS neighbor cell configuration, and the terrestrial RIS neighbor cell configuration. At step 222, the UE 202 is configured to decode the SIB19 to extract the relevant information.

Further, at step 224, the UE 202 is configured to send another SI message request to the TN-gNB/NTN-gNB 204 for SIB31. In response to sending another SI message request, at step 226, the UE 202 is configured to receive the SIB31 as a response from the TN-gNB/NTN-gNB 204. In an embodiment, the SIB31 defined in the 3GPP specifications for the NTN includes the RIS timing element. The RIS timing element provides at least one of the RIS network-controlled common timing advance parameter, the RIS common timing advance drift parameter, the RIS common timing advance drift variation parameter, the RIS scheduling offset parameter, and the RIS synchronization validity duration parameter. At step 228, the UE 202 is configured to decode the SIB19 to extract the relevant information. Upon successful retrieval and interpretation of the SIB1, the SIB19, and the SIB31, the UE 202 completes an initial configuration. Further, at step 230, the UE 202 retrieves Random Access Channel (RACH) configuration necessary from the TN-gNB/NTN-gNB 204 that are required to access the wireless network. Further, at step 232, a RACH procedure is initiated, completing an initial access phase in compliance with protocols defined in the 3GPP specifications.

The disclosed process ensures that the inclusion of MU-RIS capabilities does not interfere with existing DMRS configurations or consume additional resource elements, which would otherwise reduce user throughput. Instead, by leveraging a harmonized IE framework within existing system messages, the present disclosure provides a scalable and efficient approach to initial access in both terrestrial and non-terrestrial environments. The disclosed process supports a dual-function architecture where information with the MIMO and the RIS is processed jointly, improving overall network performance, UE battery efficiency, and access latency.

Moreover, in the context of an NTN MU-RIS-assisted communication system, the SIB19 and the SIB31 play a critical role in configuring and optimizing the NTN. To eliminate redundancies in signaling and reduce the need for duplicative procedures when both MU-MIMO and MU-RIS technologies assist the NTN infrastructure, the present disclosure introduces unified IEs within the SIBs. Specifically, the SIB19 is extended to carry satellite assistance information, including an NTN RIS configuration IE, which provides parameters for initializing and controlling the RIS timing elements within the NTN. The RIS configuration element provides at least one of the NTN RIS configurations, the non-terrestrial RIS neighbor cell configuration, and the terrestrial RIS neighbor cell configuration. The NTN RIS configuration includes specific parameters (e.g., RIS element activation pattern, phase shift matrix configuration, etc.) necessary for initializing and controlling the RIS timing element in the NTN. The non-terrestrial RIS neighbor cell configuration provides configuration details of adjacent satellite-based RIS-assisted cells to support coordinated beamforming and handover procedures. The terrestrial RIS neighbor cell configuration enables the NTN to leverage terrestrial RIS deployments for cooperative signal reflection and optimization. By integrating these unified IEs into the SIB19, the present disclosure enables coordinated operation of MU-MIMO and MU-RIS components, whether deployed terrestrially or in space, facilitating dynamic optimization of beamforming and reflective signal manipulation. This unified signaling structure reduces overhead and improves the efficiency and reliability of communications across integrated NTN-TN environments. An exemplary SIB19 message representation is depicted via an algorithm below:

Further, the SIB31 related to NTN in a non-critical extension, indicating support for the NTN. In the NTN, the SIB31 is responsible for carrying information about the position of the satellite position and default time delay. The SIB31 is important for accurate network synchronization and efficient resource allocation for narrowband, particularly Internet of Things (NB-IoT) devices. The RIS network-controlled common timing advance parameter is used for RIS-assisted transmissions. The RIS common timing advance drift parameter indicates an expected drift rate of the common timing advance due to satellite mobility or Doppler effects. The RIS common timing advance drift variation parameter provides information about the statistical variation in the drift rate of the timing advance over time. The RIS scheduling offset parameter provides a scheduling offset parameter utilized in defining the relative timing between uplink transmissions and reference signals in NTN scenarios. The RIS synchronization validity duration parameter defines the validity period for satellite ephemeris data and timing advance parameters, representing the maximum duration during which a UE (e.g., the UE 202) can rely on previously acquired satellite timing information without needing a new ephemeris update. The integration of the above-listed IEs into the SIB31 enhances temporal alignment and facilitates robust uplink synchronization across RIS-assisted NTN environments. An exemplary SIB31 message representation is depicted via an algorithm below:

```
{
  message c1: systemInformation-r13: {
    criticalExtensions systemInformation-r13: {
      sib-TypeAndInfo-r13 {
        sib31-v1700: {
          servingSatelliteInfo-r17 {
            ephemerisInfo-r17 orbitalParameters: {
              semiMajorAxis-r17 8394210402,
              eccentricity-r17 0,
              periapsis-r17 0,
              longitude-r17 242097885,
              inclination-r17 0,
              anomaly-r17 193139
            },
            nta-CommonParameters-17 {
              nta-Common-r17 7776350
            },
            ul-SyncValidityDuration-r17 s240,
            k-Offset-r17 1023
            RISnta-CommonParameters-xx {
              RISnta-Common-r17 7776350
            },
            RISul-SyncValidityDuration-rxx s240,
            RISk-Offset-rxx 1023
          }
        }
      }
    }
  }
}
```

```
SIB19-r17 ::= SEQUENCE {
    ntn-Config-r17              NTN-Config-r17 OPTIONAL, -- Need R
    ntn-RisConfig-rxx              NTN-Config-rxx OPTIONAL, -- Need R
    t-Service-r17            INTEGER (0..549755813887) OPTIONAL, -- Need R
    referenceLocation-r17          ReferenceLocation-r17 OPTIONAL, -- Need R
    distanceThresh-r17          INTEGER(0..65525) OPTIONAL, -- Need R
    ntn-NeighCellConfigList-r17    NTN-NeighCellConfigList-r17 OPTIONAL, -- Need R
    ntn-RisNeighCellConfigList-rxx          NTN-NeighCellConfigList-rxx OPTIONAL, -- Need R
    tn-RisNeighCellConfigList-rxx              TN-NeighCellConfigList-rxx OPTIONAL, -- Need R
    lateNonCriticalExtension        OCTET STRING OPTIONAL,
}
```

Figure 3:
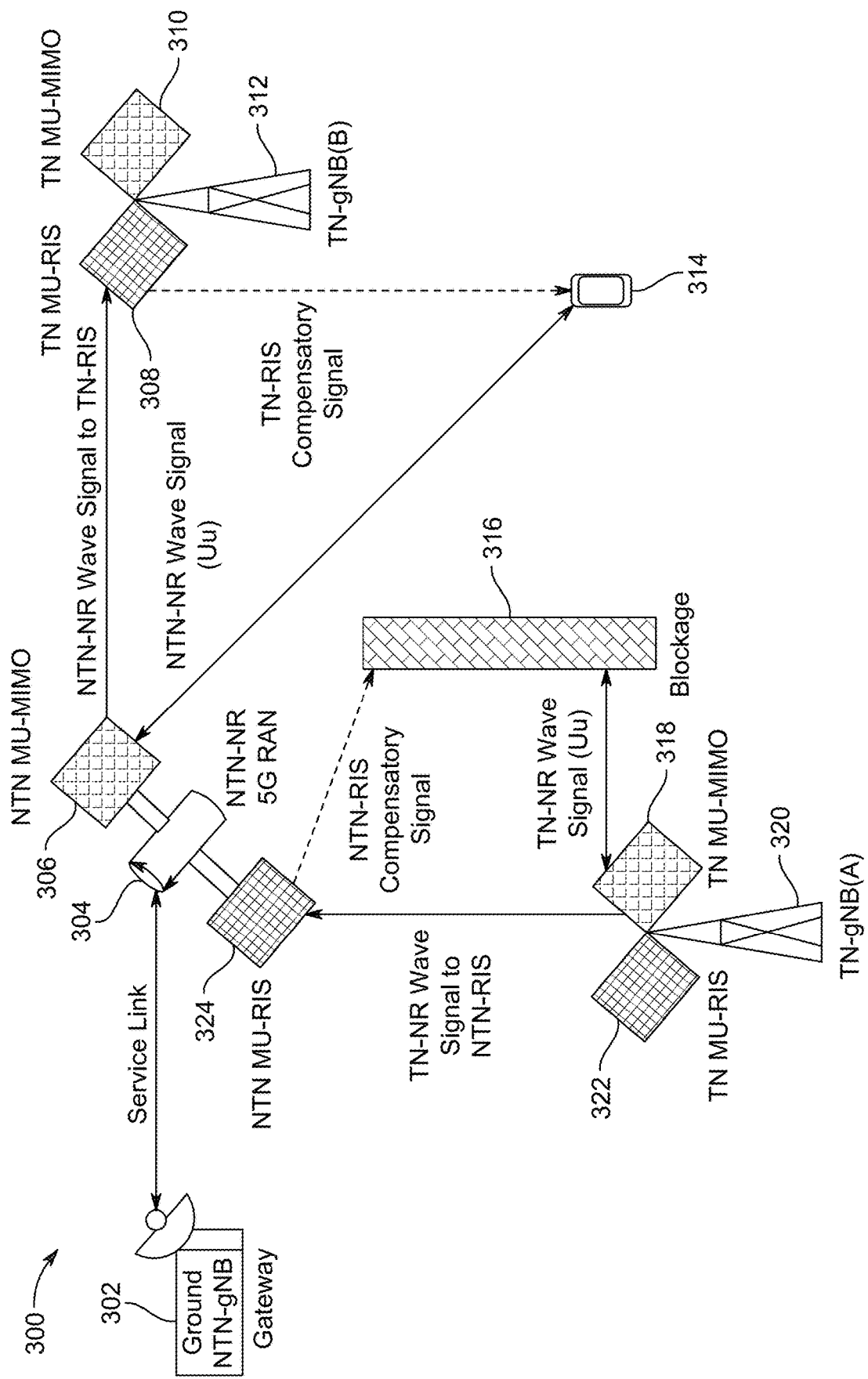
FIG. 3 is an exemplary diagram depicting a scenario associated with the unified 6G network architecture where an NTN-RIS signal path and one of TN-MIMO signal paths are blocked, according to certain embodiments.

Referring now to FIG. 3, the present disclosure provides an exemplary diagram depicting a scenario 300 associated with the unified 6G network architecture where an NTN-RIS signal path and one of TN-MIMO signal paths are blocked, according to certain embodiments. In this scenario, a blockage scenario is addressed, where both an NTN MU-RIS and a TN MU-MIMO at a TN-gNB are obstructed, impairing a UE ability to decode critical SIBs during initial access. To resolve the blockage scenario, the UE initially receives the MIB message which includes MU-RIS support indication via a parameter "RIS-TypeA-Position ENUMERATED {allowed}", thereby confirming an availability of RIS-assisted connectivity.

Upon successful decoding of the MIB message, the UE proceeds to decode the SIB1, after which the SIB19 provides vital RIS configuration information such as 'ntn-RisConfig', which defines operating parameters of the NTN-RIS and 'tn-RisNeighCellConfigList', which enumerates the configuration for neighboring TN RIS cells that may be used for assistance. This enables dynamic RIS selection based on link quality and spatial orientation. Furthermore, the SIB31 is decoded to obtain critical timing and synchronization IEs, including 'RISnta-CommonParameters', e.g., 'RISul-Sync ValidityDuration-rxx s240', defining the validity duration of uplink synchronization based on satellite ephemeris and RISK-Offset, which governs the scheduling offset used in NTN timing relationships.

In the scenario illustrated in FIG. 3, initially, a gateway (i.e., ground NTN-gNB) 302 transmits a service link toward an NTN-NR 5G RAN 306, which may operate aboard a satellite. The service link transports control signaling (e.g., synchronization, the MIB message, the SIBs, resource configuration, satellite ephemeris) and optionally, user data, ensuring a UE 314 can access the wireless network and maintain timing alignment. The NTN-NR 5G RAN 306 is equipped with an NTN MU-MIMO 306 and an NTN MU-RIS 324, allowing high-capacity transmission and flexible signal routing. In a first signal path, the NTN MU-MIMO 306 transmits an NTN-NR wave signal (Uu) directly to a UE 314. Simultaneously, the NTN MU-MIMO 306 is configured to transmit the NTN-NR wave signal (Uu) to a TN MU-RIS 308 of a TN-gNB (B) 312 via an alternate signal path. The TN-gNB (B) 312 is also equipped with a TN MU-MIMO 310. Further, the TN MU-RIS 308 is configured to reflect a TN-RIS compensatory signal to the UE 314.

Additionally, the NTN MU-RIS 324 transmits an NTN RIS compensatory signal to the UE 314. However, due to blockage 316, the NTN RIS compensatory signal does not reach the UE 314. Further, a TN MU-MIMO 318 of a TN-gNB (A) 320 transmits a TN-NR wave signal (Uu) to the UE 314. But, due to the blockage 316, the TN-NR wave signal (Uu) does not reach the UE 314. The TN-gNB (A) 320 is also equipped with a TN MU-RIS 322. The TN MU-RIS 322 may not actively transmit in a current blockage scenario shown in FIG. 3, but the presence of the TN MU-RIS 322 ensures network flexibility, failover support, and spatial coverage enhancement. In addition, the TN MU-MIMO 318 transmits the TN-NR wave signal to the NTN MU-RIS 324. In particular, due to the blockage 316, the TN MU-MIMO 318 and the NTN MU-RIS 324 cannot provide reliable coverage to the UE 314 in this scenario. To address this coverage gap, the UE 314 relies on the assistance of the TN MU-RIS 308 at the TN-gNB (B) 312, which redirects the NTN-NR wave signal from the NTN MU-MIMO 306, effectively compensating for signal deterioration from a NTN path. The NTN MU-RIS 324 also broadcasts an NTN-RIS compensatory signal directly to the UE 314 to further mitigate delay and fading caused by long-range satellite communication. This hybrid NTN-TN RIS/MIMO assisted connectivity enables the UE 314 to maintain robust initial access and uplink synchronization despite localized obstructions. The disclosed scenario thus exemplifies a seamless integration of NTN and TN MU-RIS resources for link continuity, signal enhancement, and spatial diversity in complex propagation environments.

Figure 4:
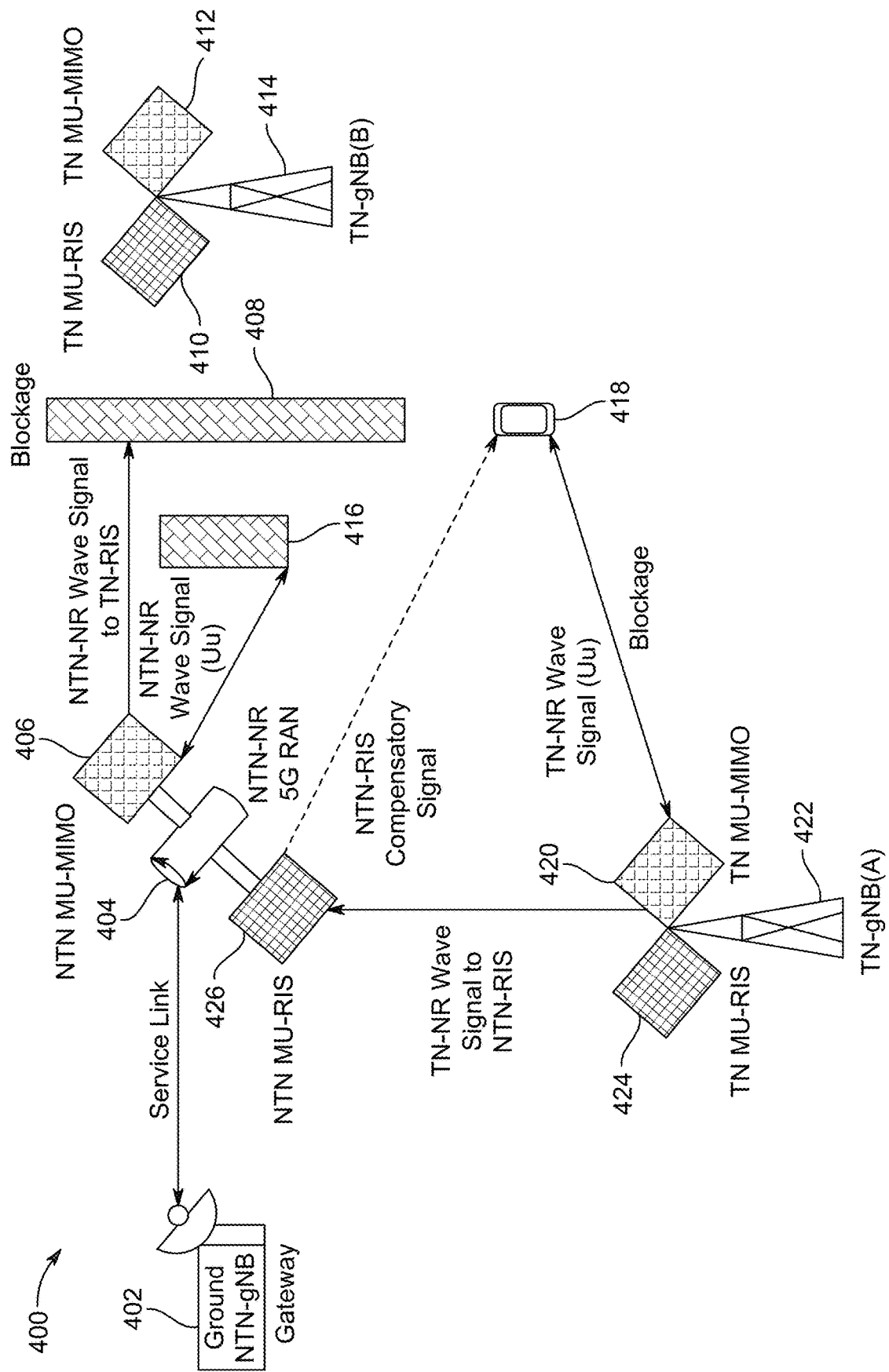
FIG. 4 is an exemplary diagram depicting another scenario associated with the unified 6G network architecture in which TN-RIS and NTN-MIMO signal paths are blocked, according to certain embodiments.

Referring now to FIG. 4, the present disclosure provides an exemplary diagram depicting another scenario associated with the unified 6G network architecture where TN-RIS and NTN-MIMO signal paths are blocked, according to certain embodiments. In the scenario 400 illustrated in FIG. 4, a ground-based NTN-gNB gateway 402 initiates a service link to an NTN-NR 5G RAN 404, operating aboard a satellite. This service link carries synchronization, control signaling, the MIB messages, the SIBs, and optional user data, enabling a UE 418 to align timing and access the wireless network. The NTN-NR 5G RAN 404 includes an NTN MU-MIMO 406 and an NTN MU-RIS 426, providing both direct and indirect signal delivery mechanisms.

In a first path, the NTN MU-MIMO 406 transmits an NTN NR wave signal (Uu) toward the UE 418 and to a TN MU-RIS 410 of a TN-gNB (B) 414. The TN-gNB (B) 414 is also equipped with a TN MU-MIMO 412. The TN MU-RIS 410 is configured to reflect a TN-RIS compensatory signal to the UE 418. However, due to a blockage 408, signal paths from the NTN MU-MIMO 406 to the TN MU-RIS 410 and from the TN MU-RIS 410 to the UE 418 are obstructed. Additionally, another signal path from the NTN MU-MIMO 406 to the UE 418 is also blocked due to a blockage 416.

To address this gap, the UE 418 relies on an NTN-RIS compensatory signal that is transmitted from the NTN MU-RIS 426 toward the UE 418. In addition, a TN MU-MIMO 420 of a TN-gNB (A) 422 transmits a TN-NR wave signal (Uu) to the UE 418. Further, the TN MU-MIMO 420 transmits a TN-NR wave signal to the NTN MU-RIS 426. The TN-NR wave signal transmitted by the TN MU-MIMO 420 to the NTN MU-RIS 426 is used for intelligent signal reflection and redirection toward the UE 418 to compensate for blockages (i.e., the blockage 408 and the blockage 416) or signal deterioration in direct paths of the TN-gNB (B) 414 to the UE 418 or the NTN-NR 5G RAN 404 to the UE 418. Further, the TN-gNB (A) 422 is equipped with a TN MU-RIS 424. The TN MU-RIS 424 may not actively transmit in a current blockage scenario shown in FIG. 4, but the presence of the TN MU-RIS 424 ensures network flexibility, failover support, and spatial coverage enhancement.

In other words, in the scenario 400, the blockage scenario is addressed, where both paths of the NTN MU-MIMO 406 and one of the TN-gNB (B) 414 are obstructed, impairing the ability of the UE 418 to decode critical SIBs during initial access. To resolve the blockage scenario, the UE 418 initially receives the MIB message, which includes MU-RIS support indication via a parameter 'RIS-TypeA-Position ENUMERATED {allowed}", thereby confirming the availability of RIS-assisted connectivity. Upon successful decoding of the MIB message, the UE 418 proceeds to decode the SIB1, after which the SIB19 provides vital RIS configuration information such as 'ntn-RisConfig' (defining operating parameters of the NTN-RIS) and 'tn-RisNeighCellConfigList' (listing configurations for neighboring TN-RIS cells). This supports dynamic RIS selection based on link quality and geometry. Furthermore, the SIB31 is decoded to obtain critical timing and synchronization parameters, including 'RISnta-CommonParameters', 'RISul-Sync ValidityDuration-rxx s240' (defining satellite-based uplink sync validity), and 'RISK-Offset' (governing scheduling offset in NTN environments).

This hybrid NTN-TN RIS/MIMO-assisted configuration enables the UE 418 to achieve robust initial access, decode essential system information, and maintain synchronization despite the presence of multiple signal blockages. The illustrated scenario demonstrates a seamless and resilient integration of NTN and TN RIS resources, ensuring link continuity, spatial diversity, and enhanced reliability in next-generation 6G networks.

Figure 5:
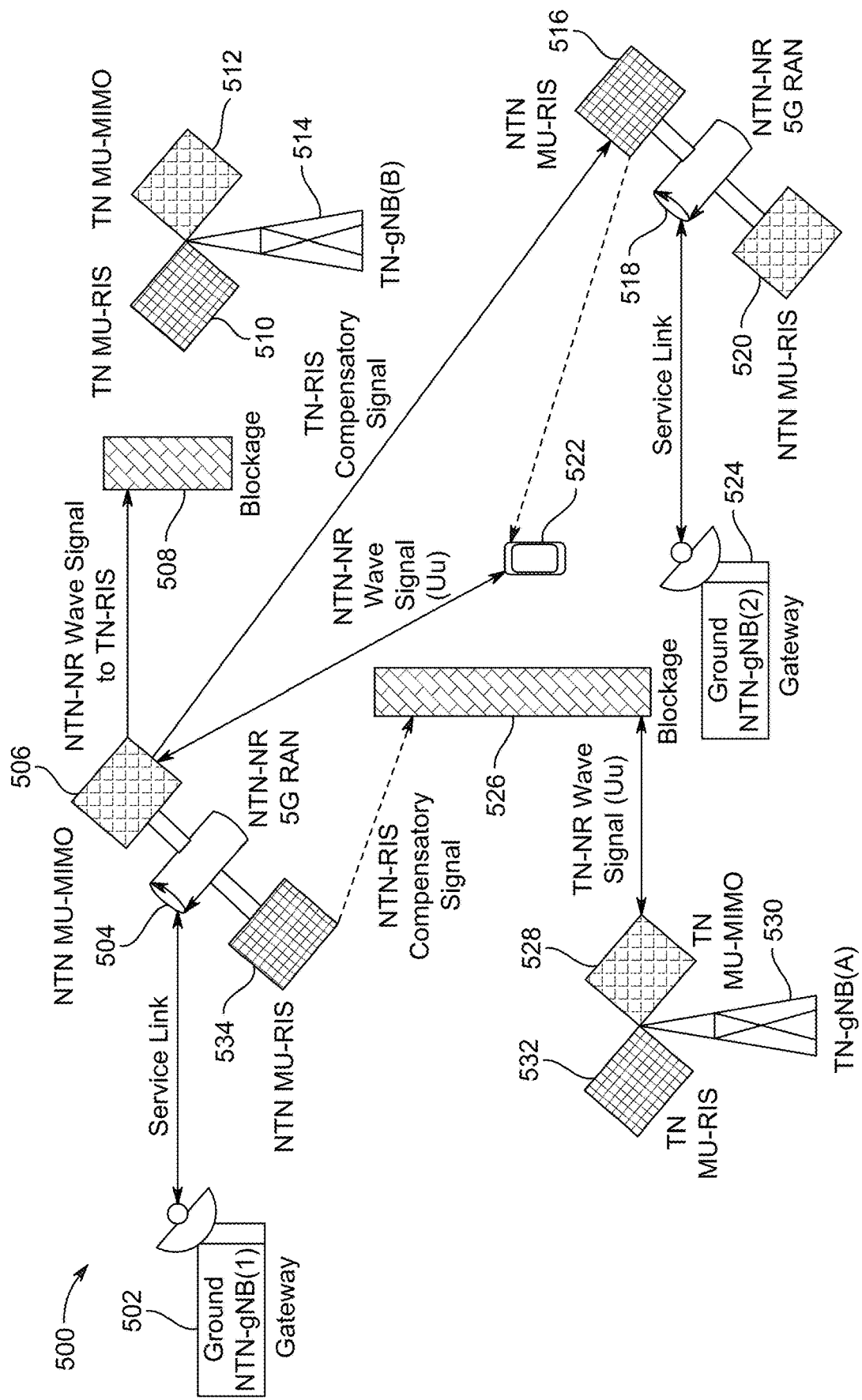
FIG. 5 is an exemplary diagram depicting another scenario associated with the unified 6G network architecture where TN-RIS and TN-MIMO signal paths are blocked, allowing NTN-RIS and NTN-MIMO signal paths to assist an NTN, according to certain embodiments.

Referring now to FIG. 5, the present disclosure provides an exemplary diagram depicting another scenario 500 associated with the unified 6G network architecture where TN-RIS and TN-MIMO signal paths are blocked, allowing NTN-RIS and NTN-MIMO signal paths to assist an NTN, according to certain embodiments. A gateway (ground NTN-gNB (1)) 502 transmits a service link to an NTN-NR 5G RAN 504, located on a satellite. The NTN-NR 5G RAN 504 is equipped with an NTN MU-MIMO 506 and an NTN MU-RIS 534. The NTN-NR 5G RAN 504 supports high-throughput transmission. The NTN MU-MIMO 506 sends an NTN-NR wave signal (Uu) toward a TN MU-RIS 510 of a TN-gNB (B) 514. The TN-gNB (B) 514 is also equipped with a TN MU-MIMO 516. However, due to a blockage 508, signals from the TN MU-RIS 510 and the TN MU-MIMO 512 are not able to reach the UE 522. Similarly, a TN-NR signal from a TN MU-MIMO 528 of a TN-gNB (A) 530 is obstructed by a blockage 526. The TN-gNB (A) 530 is also equipped with a TN MU-RIS 532. In addition, an NTN-RIS compensatory signal that is transmitted from the NTN MU-RIS 534 to the UE 522 is also blocked by the blockage 526.

In the scenario depicted in the FIG. 5, the UE 522 relies on signals transmitted by the NTN MU-MIMO 506 and an NTN-NR 5G RAN 518 linked to a gateway 524 (i.e., ground NTN-gNB (2)). The NTN MU-MIMO 506 transmits a TN-RIS compensatory signal to an NTN MU-RIS 516 of the NTN-NR 5G RAN 518. Further, the NTN-NR 5G RAN 518 is equipped with an NTN MU-RIS 520. The gateway 524 is configured to initiate a service link to the NTN-NR 5G RAN 518. The service link initiated by the gateway 524 to the NTN-NR 5G RAN 518 carries critical network signaling and control information necessary for enabling and maintaining communication with the UE 522.

In other words, in the scenario, the MIB message transmitted to the UE includes an indication of MU-RIS support, specifically through a parameter 'RIS-TypeA-Position' ENUMERATED {allowed}. Upon successful decoding of the MIB message and the SIB1, the UE 522 further obtains configuration details from the SIB19, which provides 'ntn-RisConfig' and 'ntn-RisNeighCellConfigList'. Subsequently, the SIB31 is decoded by the UE 522 to obtain additional parameters relevant for timing and synchronization within the NTN environment. The SIB31 includes 'RISnta-CommonParameters', which outlines common synchronization settings for NTN-RIS operation, 'RISul-Sync ValidityDuration-rxx s240', which specifies the validity duration for uplink synchronization in satellite-based scenarios, and 'RISK-Offset', which governs the scheduling offset applicable in the RIS-assisted NTN framework.

As illustrated in FIG. 5, the scenario in which signal blockages (i.e., the blockage 508 and the blockage 526) occur for both the TN-gNB (A) 520 and the TN-gNB (B) 514, such as when the UE 522 is located in a remote or an obstructed area. In such scenario, the UE 522 leverages the above signals paths information to facilitate connectivity through the NTN MU-MIMO 506 associated with the gateway 502, while utilizing RIS-assisted signal redirection via the NTN MU-RIS 516 associated with the gateway 524. The above configuration enables the UE 522 to compensate for signal degradation or blockages from the sky, thereby ensuring robust initial access and continued network connectivity under challenging propagation conditions.

The present disclosure provides a novel technique where MIMO and RIS technologies are unified under a common architectural framework designed to operate concentrically and seamlessly across both classical TNs and NTNs. The architectural framework introduces new defined IEs within various SIBs to enable dynamic discovery, configuration, and utilization of MIMO and RIS resources during UE access procedures. The new IEs allow a UE to effectively identify and leverage MIMO and/or RIS assistance for signal transmission and reception in one or both network domains (TN and/or NTN). The disclosed harmonized signaling structure ensures that RIS and MIMO functionalities can be jointly exploited by the UE, enabling robust initial access and connection maintenance across diverse deployment environments and coverage scenarios.

Further, the present disclosure provides an enhanced MIMO and RIS-assisted communication strategy that is proposed to optimize downlink coverage for handheld UE terminals, particularly in NTN environments characterized by inherent deployment constraints such as limited payload power, expansive satellite footprints, and restricted feeder link bandwidth. In scenarios where an NTN MU-MIMO transmitted signal is subjected to amplitude or phase degradation arising from atmospheric distortions, geographical obstacles, or electromagnetic wave interference, the disclosed architectural framework enables TN MU-RIS to compensate for such signal contamination. By adjusting reflected wavefronts, the TN MU-RIS can restore the integrity of an NTN NR wave signal received by the UE. This compensation mechanism leads to significant improvements in received signal strength indicators (e.g., RSSI, RSRP) and signal quality metrics (e.g., RSRQ), while simultaneously minimizing the energy required for transmission from NTN and/or TN sources. As a result, the disclosed architectural framework offers efficient energy utilization, extended coverage, and improved service reliability in hybrid terrestrial-non-terrestrial deployments.

Further, the present disclosure provides a novel technique to enhance uplink capacity performance in the NTN environments by employing MIMO and RIS-assisted multiplexing techniques. Given the inherently wide coverage footprint of NTN satellites and the anticipated high density of UEs within a satellite's service area, efficient spatial multiplexing is essential for scalable access. In the proposed novel technique, the MU-MIMO beamforming capabilities of either the NTN or TN infrastructure can be intelligently augmented using RIS or MIMO components. This cooperative augmentation mitigates blockages and signal degradations caused by electromagnetic wave interference from surrounding UEs or environmental obstacles. By enabling the NTN or TN to dynamically assist each other through MIMO-RIS cooperation, the proposed novel technique significantly increases spatial reuse, uplink throughput, and access reliability in densely populated or obstructed areas.

Furthermore, the present disclosure also addresses the strategic integration of MIMO and RIS technologies within NTN systems in alignment with the operational interests of global satellite service providers. Specifically, the disclosed novel technique enables the use of RIS and/or MIMO to facilitate enhanced signal quality, spectrum efficiency, and regulatory compliance across NTN and TN infrastructures. The disclosed architectural framework supports dynamic spectrum sharing between NTN and TN systems without infringing upon national geographic sovereignty or violating spectrum licensing regulations. By incorporating MIMO-RIS capabilities in a coordinated and policy-aware manner, the present disclosure ensures continuity of service across borders, rural regions, and international zones, thereby promoting a globally interoperable 3GPP-based NTN service model. The present disclosure fosters harmonization between TN and NTN while adhering to both regional spectrum policies and international service agreements.

In particular, the novel technique and the architectural framework disclosed in the present disclosure integrate MU-MIMO and MU-RIS assistance within both NTNs and TNs, offering several key technical advancements. Firstly, the disclosed architectural framework enables more efficient implementation of IEs within existing MIB messages and SIBs as defined by 3GPP specifications, ensuring seamless compatibility and minimal signaling overhead. By leveraging standardized MIMO configurations along with the SIB19 and the SIB31, the disclosed architectural framework may provide the necessary RIS-related parameters, whether from NTN or TN sources, to effectively compensate for NR signal degradation experienced by targeted UEs. Additionally, the disclosed architectural framework enhances network flexibility by extending the configuration lists of both source and neighboring RISs to include entities across NTN and TN domains. The disclosed architectural framework allows for dynamic and context-aware RIS selection, thereby improving network adaptability. Ultimately, the disclosed architectural framework delivers measurable improvements in both downlink coverage and uplink capacity, significantly boosting overall network performance and quality of service for UEs operating in complex propagation environments.

Figure 6:
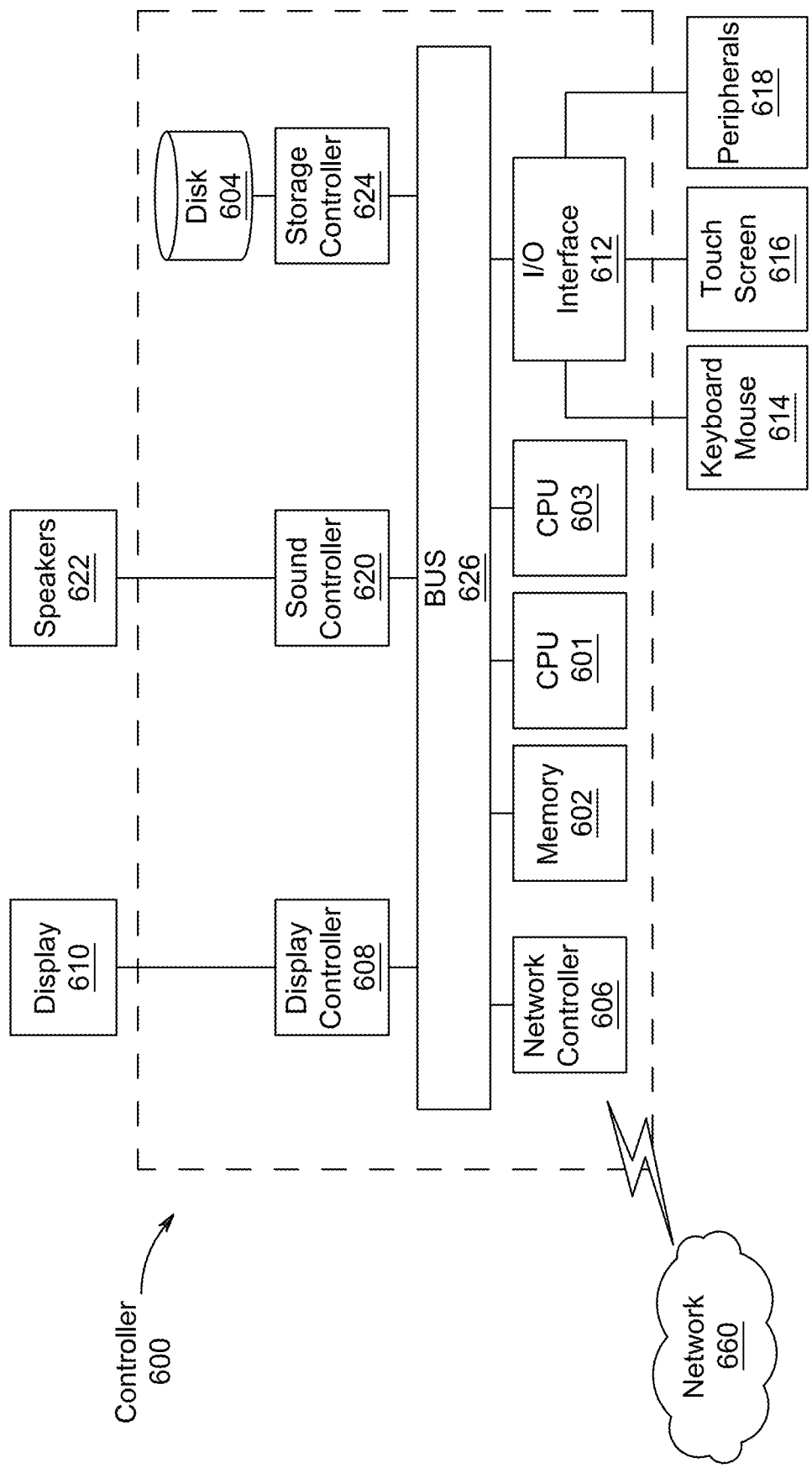
FIG. 6 is an illustration of a non-limiting example of details of computing hardware used in the computing system, according to certain embodiments.

Next, further details of the hardware description of the computing environment according to exemplary embodiments are described with reference to FIG. 6. In FIG. 6, a controller 600 is described as representative of the control circuitry 110A of FIG. 1A, in which the controller 600 is a computing device that includes a Central Processing Unit (CPU) 601, which performs the processes described above/below. The process data and instructions may be stored in a memory 602. These processes and instructions may also be stored on a storage medium disk 604, such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 601, 603 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 601 or CPU 603 may be a Xenon or a Core processor from Intel of America or an Opteron processor from Advanced Micro Devices (AMD) of America, or may be other processor types that would be recognized by one of ordinary skill in the art. Alternatively, the CPU 601, 603 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 601, 603 may be implemented as multiple processors cooperatively working in parallel to perform the instructions of the inventive processes described above.

The computing device in FIG. 6 also includes a network controller 606, such as an Intel Ethernet Professional (PRO) network interface card from an Intel Corporation of America, for interfacing with a network 660. As can be appreciated, the network 660 can be a public network, such as the Internet, or a private network such as a LAN or a WAN, or any combination thereof and can also include a PSTN or an Integrated Services Digital Network (ISDN) sub-networks. The network 660 can also be wired, such as an Ethernet network, or can be wireless, such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 608, such as a NVIDIA GeForce Giga Texel Shader eXtreme (GTX) or a Quadro graphics adaptor from a NVIDIA Corporation of America for interfacing with a display 610, such as a Hewlett Packard HPL2445w Liquid Crystal Display (LCD) monitor. A general purpose I/O interface 612 interfaces with a keyboard and/or mouse 614 as well as a touch screen panel 616 on or separate from display 610. The general purpose I/O interface 612 also connects to a variety of peripherals 618 including printers and scanners, such as an OfficeJet or DeskJet from HP.

A sound controller 620 is also provided in the computing device, such as a Sound Blaster X-Fi Titanium from Creative, to interface with speakers/microphone 622, thereby providing sounds and/or music.

A general-purpose storage controller 624 connects the storage medium disk 604 with a communication bus 626, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 610, keyboard and/or mouse 614, as well as the display controller 608, the general purpose storage controller 624, the network controller 606, the sound controller 620, and the general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 7.

Figure 7:
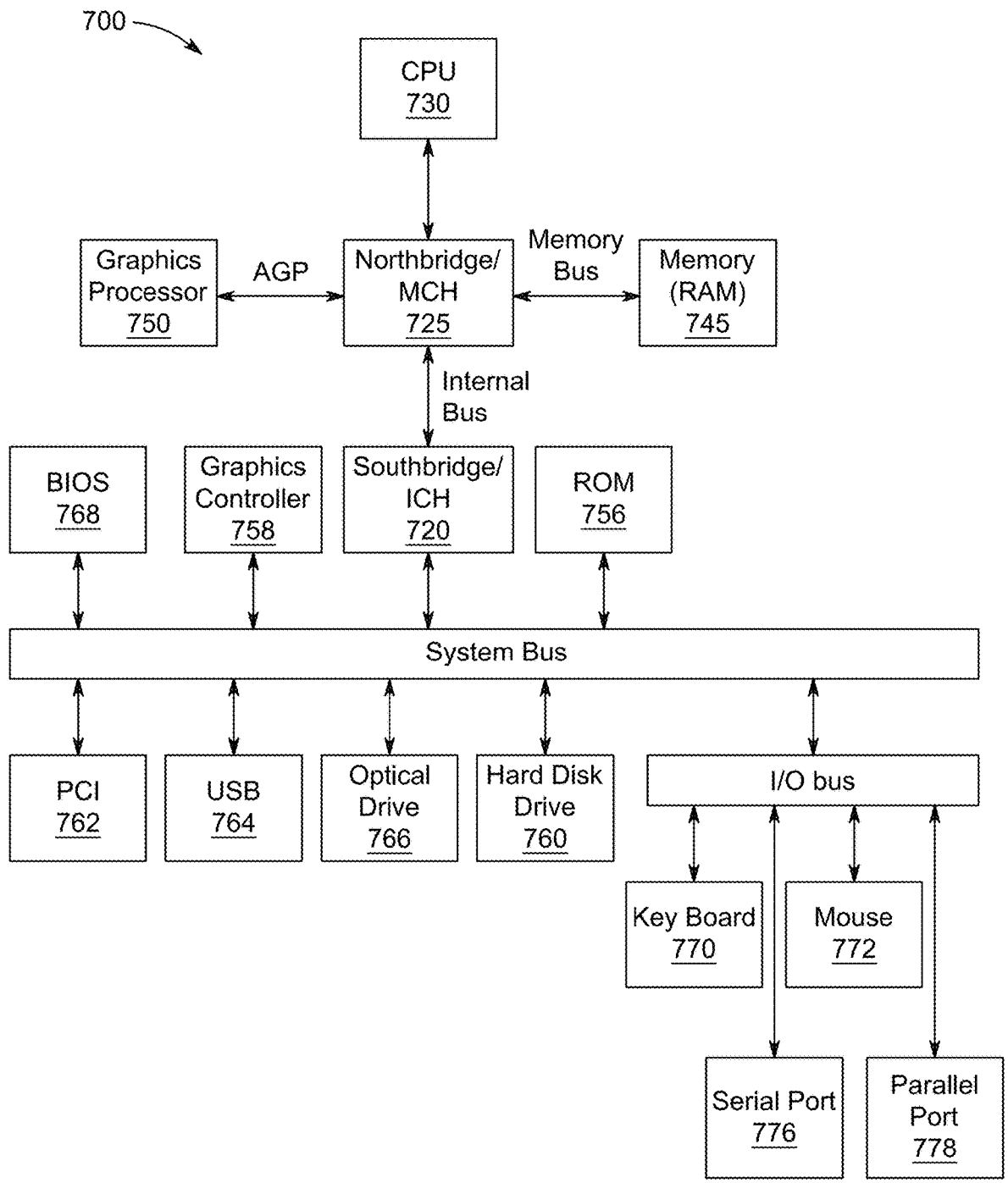
FIG. 7 is an exemplary schematic diagram of a data processing system used within the computing system, according to certain embodiments.

FIG. 7 shows a schematic diagram of a data processing system 700, according to certain embodiments, for performing the functions of the exemplary embodiments. The data processing system 700 is an example of a computer in which code or instructions implementing the processes of the illustrative embodiments may be located.

In FIG. 7, the data processing system 700 employs a hub architecture including a North Bridge and a Memory Controller Hub (NB/MCH) 725 and a south bridge and an I/O Controller Hub (SB/ICH) 720. A CPU 730 is connected to the NB/MCH 725. The NB/MCH 725 also connects to a memory 745 via a memory bus and connects to a graphics processor 750 via an Accelerated Graphics Port (AGP). The NB/MCH 725 also connects to the SB/ICH 720 via an internal bus (e.g., a unified media interface or a direct media interface). The CPU 730 may contain one or more processors and even may be implemented using one or more heterogeneous processor systems.

Figure 8:
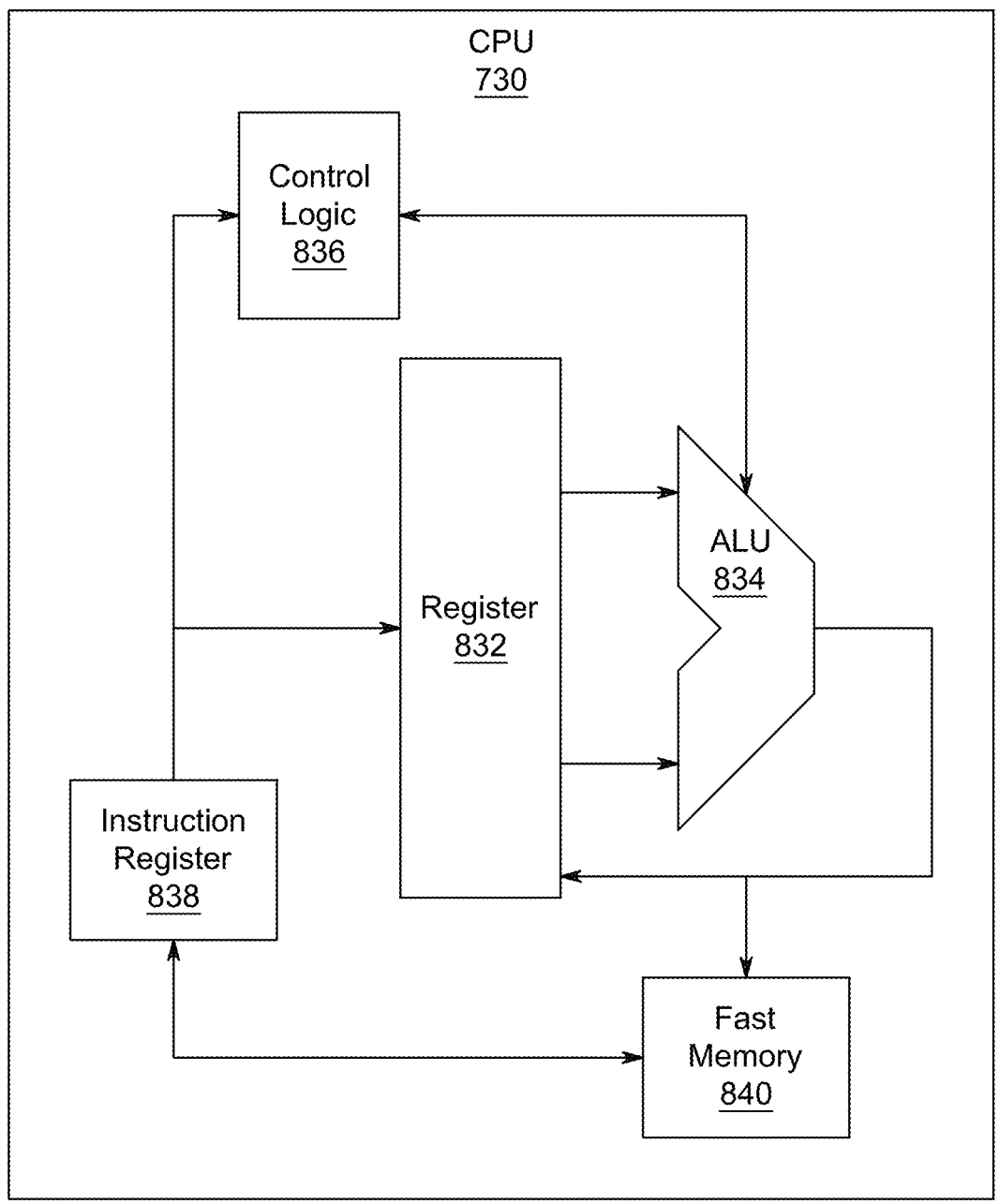
FIG. 8 is an exemplary schematic diagram of a processor used with the computing system, according to certain embodiments.

For example, FIG. 8 shows one implementation of the CPU 730. In one implementation, an instruction register 838 retrieves instructions from a fast memory 840. At least part of these instructions is fetched from the instruction register 838 by a control logic 836 and interpreted according to the instruction set architecture of the CPU 730. Part of the instructions can also be directed to a register 832. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 834 that loads values from the register 832 and performs logical and mathematical operations on the loaded values according to the instructions. The results from these operations can be feedback into the register 832 and/or stored in the fast memory 840. According to certain implementations, the instruction set architecture of the CPU 730 can use a reduced instruction set architecture, a complex instruction set architecture, a vector processor architecture, and a very large instruction word architecture. Furthermore, the CPU 730 can be based on a Von Neuman model or a Harvard model. The CPU 730 can be a digital signal processor, an FPGA, an ASIC, a Programmable Logic Array (PLA), a PLD, or a Complex Programmable Logic Device (CPLD). Further, the CPU 730 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 7, the data processing system 700 can include that the SB/ICH 720 is coupled through a system bus to an I/O Bus, a ROM 756, a Universal Serial Bus (USB) port 764, a flash Binary Input/Output System (BIOS) 768, and a graphics controller 758. PCI/PCIe devices can also be coupled to SB/ICH 788 through a PCI bus 762.

The PCI devices may include, for example, Ethernet adapters, add-in cards, and Personal Computer (PC) cards for notebook computers. The HDD 760 and an optical drive 766 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 760 and the optical drive 766 can also be coupled to the SB/ICH 720 through a system bus. In one implementation, a keyboard 770, a mouse 772, a serial port 776, and a parallel port 778 can be connected to the system bus through the I/O bus. Other peripherals and devices that can be connected to the SB/ICH 720 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 9:
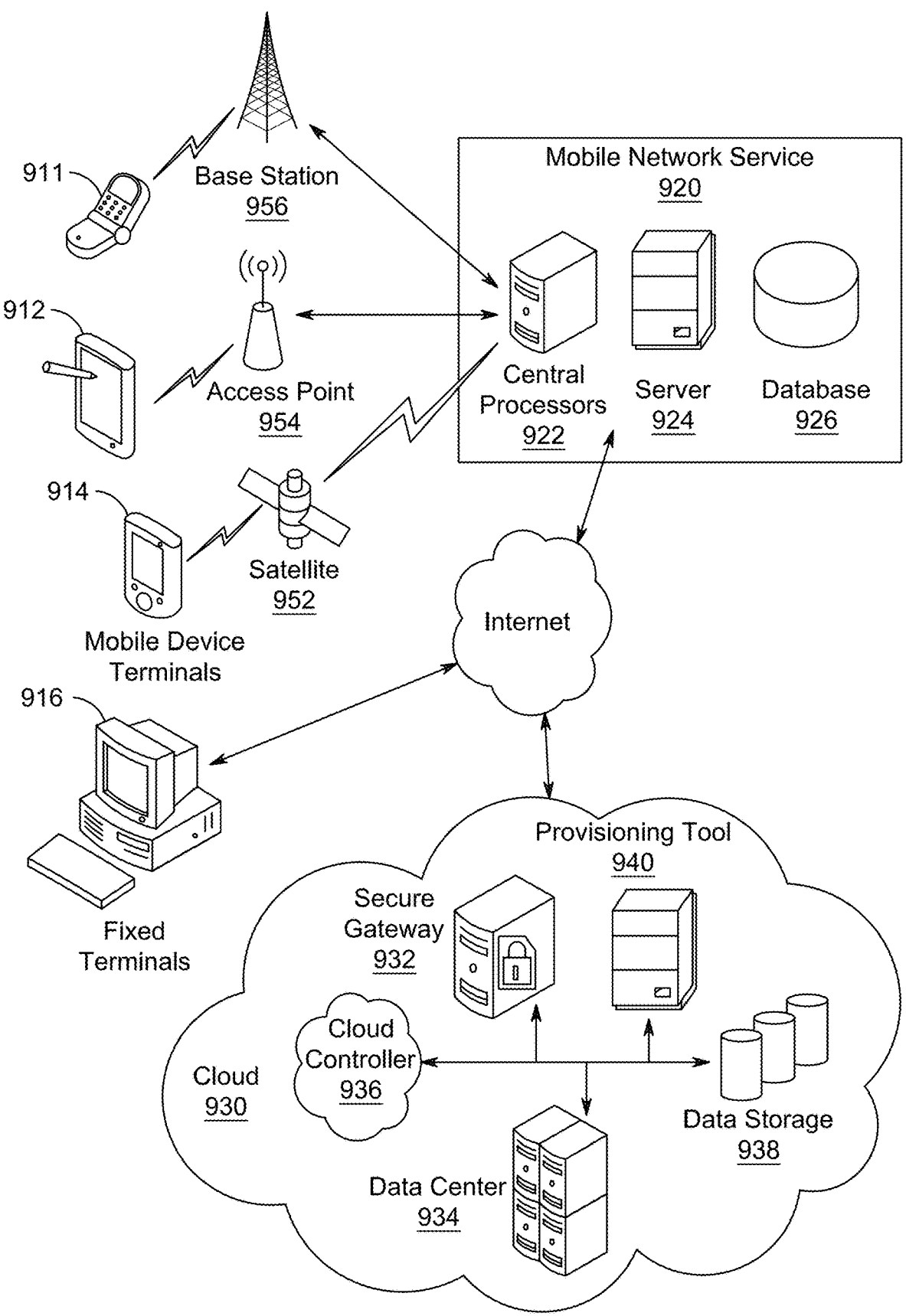
FIG. 9 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more clients and server machines, which may share processing, as shown by FIG. 9, in addition to various human interface and communication devices (e.g., display monitors, smart phones, tablets, personal digital assistants (PDAs). More specifically, FIG. 9 illustrates client devices including a smart phone 911, a tablet 912, a mobile device terminal 914 and fixed terminals 916. These client devices may be commutatively coupled with a mobile network service 920 via a base station 956, an access point 954, a satellite 952 or via an internet connection. The mobile network service 920 may comprise central processors 922, a server 924 and a database 926. The fixed terminals 916 and the mobile network service 920 may be commutatively coupled via an internet connection to functions in cloud 930 that may comprise a security gateway 932, a data center 934, a cloud controller 936, a data storage 938 and a provisioning tool 940. The network may be a private network, such as the LAN or the WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system to reduce duplicate signaling in a wireless network, comprising:
   a reconfigurable intelligent surface (RIS) mounted on a structure, positioned in a signal path between a transmitter and a receiver, having a plurality of passive reflecting elements and
   a control circuitry electrically connected to the plurality of passive reflecting elements and configured to:
   receive a RIS configuration allowance parameter from a master information block (MIB) message;
   adjust phase shifts of the plurality of passive reflecting elements based on the received RIS configuration allowance parameter; and
   adjust multi-input multi-output (MIMO) beamforming based on the received RIS configuration allowance parameter;

wherein the received RIS configuration allowance parameter adjusts both the MIMO beamforming and the phase shifts of the plurality of passive reflecting elements.

2. The system of claim 1, wherein:

the transmitter comprises a plurality of physical antenna elements and a signal processing circuit that is configured to generate a demodulation reference signal (DMRS) according to a DMRS configuration; and the control circuitry comprises a processor and a memory electrically connected to the plurality of passive reflecting elements, wherein the MIB message includes a RIS configuration allowance parameter that indicates whether RIS operation is permitted in coordination with the DMRS configuration, and wherein the control circuitry adjusts the phase shifts of the plurality of passive reflecting elements based on the RIS configuration allowance parameter.

3. The system of claim 1, wherein:

the control circuitry comprises a signal processing subsystem configured to extract and process system information block 19 (SIB19) and system information block 31 (SIB31) from a non-terrestrial network (NTN), the SIB19 and the SIB31 contain a RIS configuration element and a RIS timing element that the control circuitry uses to coordinate both the MIMO beamforming and the phase shift adjusting.

4. The system of claim 1, wherein:

the structure is a terrestrial structure within a terrestrial network (TN), the RIS mounted on the structure is electromagnetically coupled to an NTN component with a non-terrestrial MIMO antenna, and the NTN component operates according to a $3^{rd}$ generation partnership project (3GPP) specifications for the NTN.

5. The system of claim 1, further comprising an NTN MIMO (NTN-MIMO) transmitter located on a satellite within the NTN, wherein the NTN-MIMO transmitter is electromagnetically coupled to the RIS and comprises:

a parameter generation processor configured to generate the RIS configuration allowance parameter;

an encoding processor communicatively coupled to the parameter generation processor and configured to:

encode the RIS configuration allowance parameter into the MIB message;

encode the RIS configuration element into the SIB19 as defined in the 3GPP specifications for the NTN to adjust both the NTN-MIMO beam forming and the phase shifts of the plurality of passive reflecting elements; and encode the RIS timing element into the SIB31 as defined in the 3GPP specification for the NTN to adjust both the NTN-MIMO beam forming and the phase shifts of the plurality of passive reflecting elements; and a radio frequency (RF) transmission circuit communicatively coupled to the encoding processor and configured to transmit the encoded MIB message, the SIB19, and the SIB31 to the receiver.

6. The system of claim 1, wherein the control circuitry comprises:

a signal analysis circuit configured to detect signal degradation in an NTN MIMO (NTN-MIMO) beam forming operation;

a resource identification circuit configured to identify the plurality of passive reflecting elements for signal compensation;

a phase adjustment circuit configured to adjust the plurality of passive reflecting elements to compensate for amplitude or phase degradation; and a signal quality measurement circuit configured to monitor specific received signal strength indicator (RSSI) and reference signal received quality (RSRQ) parameters while reducing energy transmission requirements.

7. The system of claim 1, wherein the control circuitry comprises:

a blockage detection circuit configured to identify blockages affecting the NTN-MIMO beam forming operation;

a coordination circuit configured to coordinate signals between the NTN-MIMO transmitter and the plurality of passive reflecting elements of the RIS;

a multiplexing circuit configured to process signals for uplink capacity improvement; and a spectrum management circuit configured to improve spectrum utilization within geographical regulatory constraints.

8. The system of claim 1, further comprising a user equipment (UE) comprising:

the receiver electromagnetically coupled to the RIS; and a processor operatively connected to the receiver and configured to:

decode the MIB message transmitted by the NTN-MIMO transmitter and containing the RIS configuration allowance parameter for adjusting both the NTN-MIMO beam forming and the phase shifts of the plurality of passive reflecting elements;

interpret the SIB19 containing the RIS configuration element and the SIB31 containing the RIS timing element for adjusting the NTN-MIMO beam forming and the phase shifts of the plurality of passive reflecting elements; and coordinate signal reception adjustments based on the RIS configuration allowance parameter.

9. The system of claim 8, wherein:

the control circuitry is configured to implement different operational modes based on a signal condition; and the processor of the UE is configured to switch between different connection configurations in coordination with the control circuitry, wherein the operational modes and the connection configurations include:

a TN MIMO with TN RIS assistance mode, an NTN MIMO with a TN RIS assistance mode, and an NTN MIMO with an NTN RIS assistance mode.

10. The system of claim 8, wherein the processor of the UE is further configured to maintain connection during blockage events by switching between:

a primary connection using NTN-MIMO technology and a secondary assistance from the RIS; or a primary connection through the RIS and a secondary assistance using NTN-MIMO technology.

11. The system of claim 1, wherein:

the control circuitry includes a resource management circuit configured to identify and coordinate the plurality of passive reflecting elements resources and a MIMO resource across a TN and an NTN; and wherein the coordination of the plurality of passive reflecting elements resources and a MIMO occurs based on the RIS configuration allowance parameter in the MIB message and implemented using the RIS configuration element in the SIB19 and the RIS timing element in the SIB31 to reduce duplicate signaling procedures across the wireless network.

12. The system of claim 1, wherein:
the control circuitry comprises a signal processing subsystem configured to extract and process neighbor cell configuration information through the SIB19, wherein the SIB19 is defined in the 3GPP specifications for the NTN and includes the RIS configuration element providing information about a non-terrestrial RIS neighbor cell configuration and a terrestrial RIS neighbor cell configuration, and
the control circuitry uses the neighbor cell configuration information to coordinate the phase shifts of the plurality of passive reflecting elements across a plurality of network cells.

13. The system of claim 1, wherein:
the control circuitry comprises a timing circuit configured to extract and process a timing parameter including RIS network timing advance parameters from the NTN-MIMO transmitter, and
the control circuitry synchronizes the phase shifts of the plurality of passive reflecting elements based on the RIS network timing advance parameters.

14. The system of claim 1, wherein:
the plurality of passive reflecting elements are configured with individually adjustable phase shifts,
the control circuitry comprises an adaptive adjustment circuit configured to adjust the individual phase shifts to compensate for signal degradation due to an atmospheric, a geographical, or an electromagnetic condition, and
the adjustments are updated based on the RSSI and RSRQ parameters.

15. The system of claim 1, wherein:
the RIS configuration allowance parameter in the MIB message includes a "RIS-TypeA-Position" parameter with an enumerated value of {allowed, notAllowed} that indicates whether the phase shifts of the plurality of passive reflecting elements are permitted in coordination with a "dmrs-TypeA-Position" parameter.

16. The system of claim 1, wherein:
the SIB19 defined in the 3GPP specifications for the NTN includes the RIS configuration element providing at least one of: a NTN RIS configuration, a non-terrestrial RIS neighbor cell configuration, and a terrestrial RIS neighbor cell configuration.

17. The system of claim 1, wherein:
the SIB31 defined in the 3GPP specifications for the NTN includes the RIS timing element providing at least one of: a RIS network-controlled common timing advance parameter, a RIS common timing advance drift parameter, a RIS common timing advance drift variation parameter, a RIS scheduling offset parameter, and a RIS synchronization validity duration parameter.

18. The system of claim 1, wherein:
the control circuitry comprises a coverage enhancement circuit configured to improve downlink coverage by compensating for an NTN signal contamination using the phase shifts of the plurality of passive reflecting elements operation, and
the control circuitry comprises a capacity enhancement circuit configured to increase uplink capacity through multiplexing techniques using coordinated beam forming between the NTN-MIMO transmitter and the RIS.

* * * * *